(12) United States Patent
Hashimoto et al.

(10) Patent No.: US 6,842,568 B2
(45) Date of Patent: Jan. 11, 2005

(54) METHOD OF MAKING DIFFRACTION GRATING DEVICE, DIFFRACTION GRATING DEVICE, AND APPARATUS FOR MAKING DIFFRACTION GRATING DEVICE

(75) Inventors: Ken Hashimoto, Yokohama (JP); Akira Inoue, Yokohama (JP); Masaki Ohmura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 127 days.

(21) Appl. No.: 10/402,148

(22) Filed: Mar. 31, 2003

(65) Prior Publication Data

US 2003/0228106 A1 Dec. 11, 2003

Related U.S. Application Data

(63) Continuation-in-part of application No. 10/359,206, filed on Feb. 6, 2003, now abandoned, which is a continuation of application No. 09/722,048, filed on Nov. 27, 2000, now Pat. No. 6,519,389.

(30) Foreign Application Priority Data

Nov. 25, 1999 (JP) .......................................... P11-334378

(51) Int. Cl.[7] ................................................ G02B 6/24
(52) U.S. Cl. .......................................... 385/37; 430/290
(58) Field of Search ................... 385/37, 123; 430/290, 430/321; 359/123, 124, 127, 135, 138, 140

(56) References Cited

U.S. PATENT DOCUMENTS

| | | | |
|---|---|---|---|
| 5,691,831 A | | 11/1997 | Taki |
| 5,694,502 A | | 12/1997 | Byron |
| 6,021,242 A | * | 2/2000 | Harumoto et al. ............. 385/37 |
| 6,130,973 A | | 10/2000 | Lauzon et al. |
| 6,292,282 B1 | | 9/2001 | Mossberg et al. |
| 6,298,183 B1 | | 10/2001 | Yamauchi et al. |
| 6,310,996 B1 | | 10/2001 | Byron |
| 6,370,301 B1 | | 4/2002 | Kokura |
| 6,483,955 B2 | * | 11/2002 | Shiozaki et al. ............... 385/10 |
| 6,507,003 B2 | * | 1/2003 | Amako et al. ......... 219/121.76 |
| 6,519,389 B1 | | 2/2003 | Hashimoto et al. |
| 6,618,116 B1 | * | 9/2003 | Murata et al. ............... 349/201 |
| 2001/0017184 A1 | * | 8/2001 | Koeda et al. ................ 156/233 |

* cited by examiner

Primary Examiner—Ellen E. Kim
(74) Attorney, Agent, or Firm—McDermott Will & Emery LLP

(57) ABSTRACT

In a method of making a diffraction grating device, an optical waveguide is irradiated, by way of a phase grating mask, with refractive index modulation inducing light so as to form a diffraction grating in the predetermined region. This method comprises (1) a step of measuring a diffraction efficiency distribution of the phase grating mask; and (2) a step of longitudinally scanning the optical waveguide with the refractive index modulation inducing light by way of the phase grating mask and irradiating the optical waveguide with the refractive index modulation inducing light so as to modulate a refractive index of the predetermined region. Upon scanning with the refractive index modulation inducing light, longitudinal relative positions of the phase grating mask and optical waveguide are changed according to the diffraction efficiency distribution of the phase grating mask.

11 Claims, 23 Drawing Sheets

METHOD OF MAKING DIFFRACTION GRATING DEVICE, DIFFRACTION GRATING DEVICE, AND APPARATUS FOR MAKING DIFFRACTION GRATING DEVICE

RELATED APPLICATIONS

This is a Continuation-In-Part application of U.S. patent application Ser. No. 10/359,206, filed Feb. 6, 2003 abandoned, which continuation of U.S. patent application Ser. No. 09/722,048 filed on Nov. 27, 2000, now U.S. Pat. No. 6,519,389.

BACKGROUND OF THE INVENTION

1. Field of the Invention

The present invention relates to a method of making a diffraction grating device in which an optical waveguide is irradiated, by way of a phase grating mask, with light capable of inducing a refractive index modulation in an optical waveguide region of the optical waveguide so as to form a diffraction grating in the optical waveguide region; the diffraction grating device made by this method; and an apparatus for making the diffraction grating device.

2. Related Background Art

Diffraction grating device comprises a diffraction grating formed in an optical waveguide region of an optical waveguide (e.g. an optical fiber, planar optical waveguide, and the like) and is used as an optical filter and the like. Such a diffraction grating device is manufactured as follows. Namely, by way of a phase grating mask, an optical waveguide is irradiated with a predetermined wavelength of light capable of inducing a refractive index modulation (which is ultraviolet light in general, and will hereinafter be referred to as "refractive index modulation inducing light") Then, interference fringes of the refractive index modulation inducing light are generated in an optical waveguide region of the optical waveguide. Hence, the refractive index at a predetermined part of the optical waveguide region provided with the interference fringes is modulated, whereby a diffraction grating is formed.

Here, laser light emitted from a light source such as a KrF laser light source, which outputs the refractive index modulation inducing light, has a luminous flux diameter smaller than the length of the diffraction grating device to be manufactured. As a consequence, a diffraction grating device having a desirable length is made when the refractive index modulation inducing light is made incident on the diffraction grating while being scanned longitudinally of the optical waveguide.

SUMMARY OF THE INVENTION

The inventors studied the conventional technique mentioned above and, as a result, have found a problem as follows. Namely, when making a diffraction grating device, e.g., when making a uniform diffraction grating, a phase grating mask having a uniform diffraction efficiency distribution within a plane should be used. However, since the diffraction efficiency distribution of the phase grating mask is not always set uniformly within a plane, a nonuniform diffraction grating may be made even if a uniform diffraction grating is intended to be made. Thus, the above-mentioned conventional technique has been problematic in that diffraction grating devices having desirable characteristics cannot be made if the diffraction efficiency distribution of a phase grating mask deviates from its desirable distribution.

For overcoming the above-mentioned problem, it is an object of the present invention to provide a method of making a diffraction grating device, which can make a diffraction grating device having a desirable characteristic even when the diffraction efficiency distribution of a phase grating mask deviates from a desirable distribution, the diffraction grating device made by this method, and an apparatus for making the diffraction grating device.

The present invention provides a method of making a diffraction grating device, in which an optical waveguide is irradiated, by way of a phase grating mask, with refractive index modulation inducing light capable of inducing a refractive index modulation in a predetermined region of the optical waveguide so as to form a diffraction grating in the predetermined region. This method comprises (1) a diffraction efficiency distribution measuring step of measuring a diffraction efficiency distribution of the phase grating mask; and (2) a refractive index modulating step of longitudinally scanning the optical waveguide with the refractive index modulation inducing light by way of the phase grating mask and irradiating the optical waveguide with the refractive index modulation inducing light so as to modulate a refractive index of the predetermined region. In the refractive index modulating step, upon scanning with the refractive index modulation inducing light, longitudinal relative positions of the phase grating mask and optical waveguide are changed according to the diffraction efficiency distribution of the phase grating mask.

Preferably, in the method of making a diffraction grating device in accordance with the present invention, the phase grating mask is longitudinally vibrated relative to the optical waveguide with a predetermined amplitude in the refractive index modulating step.

Preferably, in the method of making a diffraction grating device, the predetermined amplitude at the time of relatively vibrating the phase grating mask and the optical waveguide with respect to each other is adjusted at each position in a longitudinal direction according to the diffraction efficiency distribution of the phase grating mask.

Preferably, in the refractive index modulating step in the method of making a diffraction grating device, the predetermined region of the optical waveguide is scanned with the refractive index modulation inducing light for a plurality of times, whereas the amount of fluctuation in the relative positions at an odd-numbered scan and the amount of fluctuation in the relative positions at an even-numbered scan are made symmetrical to each other about a center of fluctuation of the relative positions.

Preferably, in the method of making a diffraction grating device, the amount of fluctuation in the relative positions is determined according to a target value of refractive index modulation amplitude designed according to the diffraction efficiency distribution.

Preferably, in the method of making a diffraction grating device, the amount of fluctuation in the relative positions is determined according to a power distribution of the refractive index modulation inducing light as well.

The present invention provides an apparatus for making an optical waveguide diffraction grating, which irradiates, by way of a phase grating mask, an optical waveguide with refractive index modulation inducing light capable of inducing a refractive index modulation in a predetermined region of the optical waveguide so as to form a diffraction grating in the predetermined region. This apparatus comprises (1) diffraction efficiency distribution measuring means for measuring a diffraction efficiency distribution of the phase grating mask; (2) refractive index modulating means for longitudinally scanning the optical waveguide with the refractive index modulation inducing light by way of the phase grating mask and irradiating the optical waveguide with the refractive index modulation inducing light so as to modulate a refractive index of the predetermined region; and (3) relative position changing means for changing longitudinal relative positions of the phase grating mask and optical waveguide according to the diffraction efficiency distribution of the phase grating mask upon scanning with the refractive index modulation inducing light.

Preferably, in the apparatus for making a diffraction grating device in accordance with the present invention, the relative position changing means comprises a piezoelectric device for changing at least one of positions of the phase grating mask and optical waveguide.

The present invention provides a diffraction grating device made by the method mentioned above.

The present invention provides an optical communication system comprising the above-mentioned diffraction grating device.

The present invention provides an apparatus for making a diffraction grating device, which irradiates, by way of a phase grating mask, an optical waveguide with refractive index modulation inducing light capable of inducing a refractive index modulation in a predetermined region of the optical waveguide so as to form a diffraction grating in the predetermined region. This apparatus comprises (1) refractive index modulating means for longitudinally scanning the optical waveguide with refractive index modulation inducing light by way of the phase grating mask and irradiating the optical waveguide with the refractive index modulation inducing light so as to modulate a refractive index of the predetermined region; and (2) relative position changing means for changing longitudinal relative positions of the phase grating mask and optical waveguide according to a diffraction efficiency distribution of the phase grating mask upon scanning with the refractive index modulation inducing light.

The present invention will become more fully understood from the detailed description given hereinbelow and the accompanying drawings. They are given by way of illustration only, and thus should not be considered limitative of the present invention.

BRIEF DESCRIPTION OF THE DRAWINGS

FIG. 5A is a graph showing an example of vibration amplitude of a phase grating mask at each position in z-axis direction, whereas

FIGS. 6A and 6B are graphs showing specific examples of vibrations of a phase grating mask, whereas

DETAILED DESCRIPTION OF THE PREFERRED EMBODIMENTS

In the following, embodiments of the present invention will be explained in detail with reference to the accompanying drawings. In the explanation of drawings, constituents identical to each other will be referred to with numerals or letters identical to each other, without repeating their overlapping descriptions.

Figure 1:
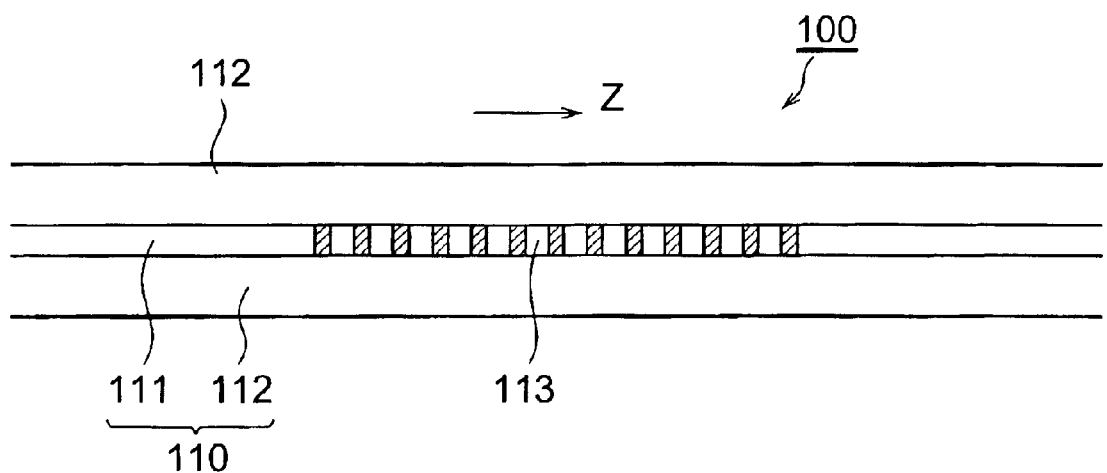
FIG. 1 is an explanatory view of the diffraction grating device in accordance with an embodiment of the present invention.

First, a diffraction grating device in accordance with an embodiment will be explained. FIG. 1 is an explanatory view of the diffraction grating device 100 in accordance with this embodiment. FIG. 1 shows a cross section of the diffraction grating device 100 taken along a plane including its optical axis.

The diffraction grating device 100 comprises an optical fiber 110, which is an optical waveguide, having a diffraction grating 113 formed therewith. The optical fiber 110, which is mainly composed of silica glass, comprises a core region 111, doped with $GeO_2$, including an optical axis center; and a cladding region 112 surrounding the core region 111. In the optical fiber 110, a predetermined area (hereinafter referred to as "refractive index modulation forming area") extending longitudinally thereof is formed with the diffraction grating 113 caused by refractive index modulation.

Z axis is set longitudinally of the optical fiber 110, whereas the origin of z axis is defined as the center position of the refractive index modulation forming area. The grating spacing (grating period) of the refractive index modulation formed in the refractive index modulation forming area is a predetermined value Λ, whereby the refractive index distribution n(z) of the diffraction grating 113 in the refractive index modulation forming area is represented by the following expression (1):

$$n(z) = n_0 + F(z) \cdot \cos\left(\frac{2\pi}{\Lambda} z\right) \quad (1)$$

where $n_0$ is the average effective refractive index of the optical fiber 110 in the refractive index modulation forming area, whereas F(z) is the amplitude distribution of refractive index modulation in the refractive index modulation forming area such as sinc function and cos function, for example. The diffraction grating device 100 can selectively reflect light having a reflection wavelength $\lambda(=2n_0\Lambda)$ by the diffraction grating 113. By optimizing the refractive index modulation amplitude distribution F(z), the diffraction grating device 100 can suppress its wavelength dispersion, attain a fixed wavelength dispersion, or selectively reflect a plurality of wavelengths of signal light.

Figure 2:
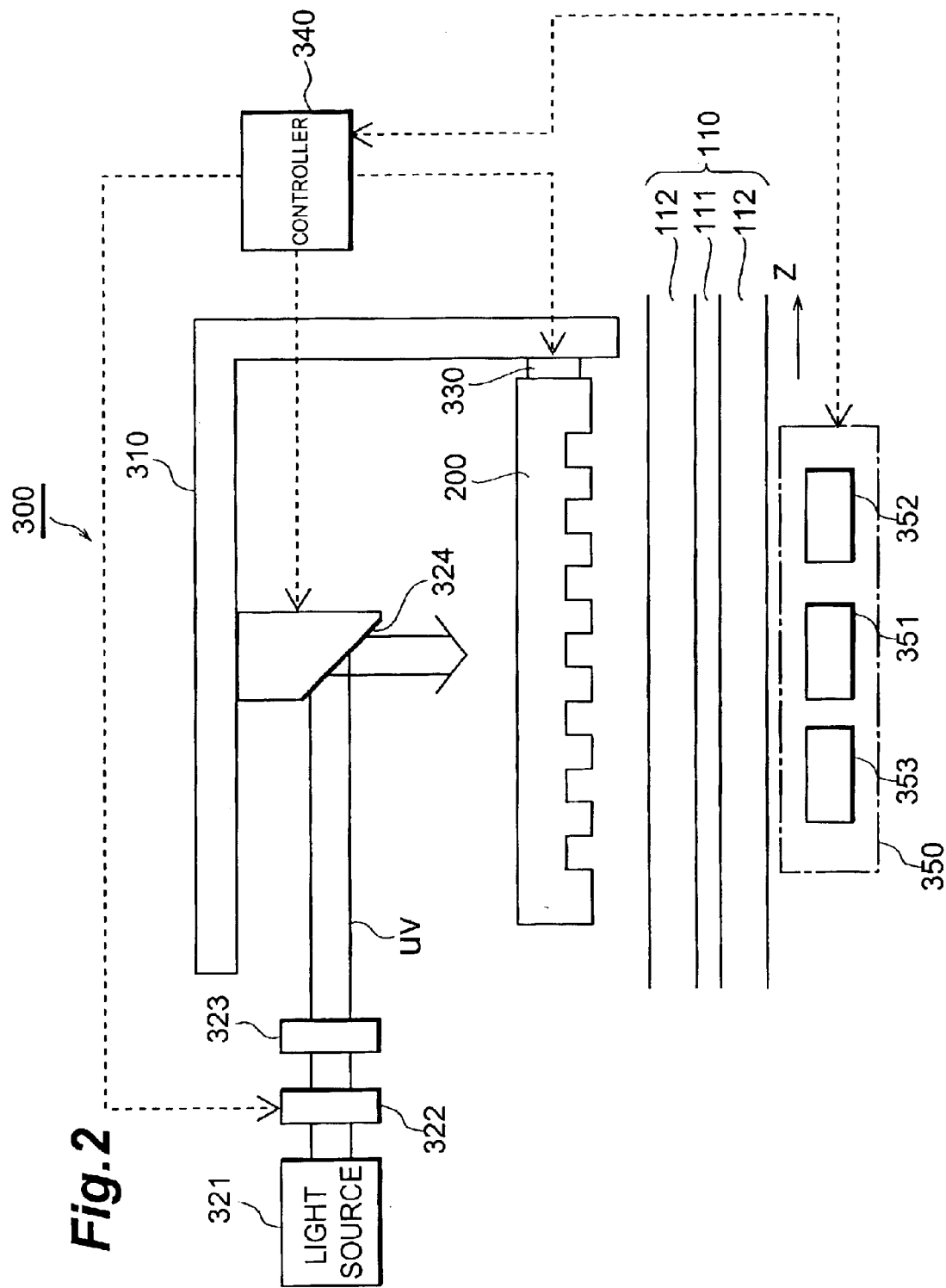
FIG. 2 is an explanatory view of the apparatus for making a diffraction grating device in accordance with an embodiment of the present invention.

An apparatus for making a diffraction grating device in accordance with an embodiment will now be explained. FIG. 2 is an explanatory view of an apparatus 300 for making a diffraction grating device in accordance with this embodiment. This apparatus 300 is favorably used together with a phase grating mask 2000 when making the above-mentioned diffraction grating device 100.

This apparatus 300 comprises a fixing member 310, a light source 321, a shutter 322, an optical system 323, a mirror 324, a piezoelectric device 330, and a controller 340. In this apparatus 300, the optical fiber (optical waveguide) 110 is disposed directly below the phase grating mask 200.

The optical fiber 110 has the core region 111 located at the center thereof, and the cladding region 112 surrounding the core region 111. Though the light guided through the optical fiber 110 is confined within the core region 111, its energy partly exists in the cladding region 112 near the core region 111 as well. The optical fiber 110 is mainly composed of silica glass, while its optical waveguide region (at least the core region 111) is doped with $GeO_2$. As a consequence, when the optical fiber 110 is irradiated with refractive index modulation inducing light, the refractive index of the region doped with $GeO_2$ is modulated according to the intensity of irradiation.

In the apparatus 300, the light source 321, shutter 322, optical system 323, mirror 324, and controller 340 constitute a refractive index modulating means which irradiates the optical fiber 110 with refractive index modulation inducing light and thereby modulates its refractive index. The piezo electric device 330 constitutes a relative position changing means for changing relative positions of the optical fiber 110 and phase grating mask 200 in the z-axis direction by altering the z-axis position of the phase grating mask 200 disposed beside the optical fiber 110.

The light source 321 outputs refractive index modulation inducing light UV having a wavelength capable of inducing a refractive index change in the core region 111 of the optical fiber 110. Favorably employed as the light source 321 is a KrF excimer laser light source outputting laser light at a wavelength of 248 nm as refractive index modulation inducing light UV, for example. The shutter 322 is disposed between the light source 321 and mirror 324, and selectively allows and blocks the passage of the refractive index modulation inducing light UV outputted from the light source 321. As the shutter 322, an acousto optic device is favorably used, whereby the ON/OFF control of the passage of refractive index modulation inducing light UV can be carried out at a high speed.

The optical system 323 is disposed between the shutter 322 and mirror 324, and is used for causing the refractive index modulation inducing light UV to attain a predetermined value (preferably 500 µm or less, more preferably 100 µm or less) of luminous flux width in the z-axis direction when irradiating the optical fiber 110. As the optical system 323, a condenser lens or an aperture having a predetermined aperture width is favorably used. When a condenser lens is used as the optical system 323, the energy of refractive index modulation inducing light UV is effectively utilized, whereby an excellent diffraction grating producing efficiency is attained. When an aperture is used as the optical system 323, mechanical damages to the optical fiber 110 are reduced.

The mirror 324 has a reflecting surface tilted by 45 degrees with respect to the z-axis direction, whereby the refractive index modulation inducing light UV advancing in the z-axis direction by way of the optical system 323 is reflected into a direction perpendicular to the z axis. The mirror 324 irradiates the optical fiber 110 with thus reflected refractive index modulation inducing light UV by way of the phase grating mask 200. The mirror 324 is secured to the fixing member 310 so as to be movable along the z axis.

The phase grating mask 200 comprises a silica glass plate having one surface formed with a phase grating having a grating spacing 2Λ, and is arranged such that the surface formed with the phase grating is opposed to the optical fiber 110. The grating spacing of the phase grating mask 200 is two times the grating spacing Λ of the diffraction grating 113 to be formed in the optical fiber 110. The phase grating mask 200 is secured to the fixing member 310 by way of a piezoelectric device 330, and is displaceable along the z axis by operations of the piezoelectric device 330.

The controller 340 moves the mirror 324 along the z axis with respect to the fixing member 310. As a consequence, the controller 340 scans the position at which the optical fiber 110 is irradiated with the refractive index modulation inducing light UV over a predetermined region (refractive index modulation forming area) of the optical fiber 110. Preferably, at this time, the controller 340 scans the irradiation position of refractive index modulation inducing light UV at a constant speed. In this case, the average effective refractive index in the refractive index modulation forming area of the optical fiber 110 becomes longitudinally uniform.

Also, the controller 340 regulates the piezoelectric device 330 so as to displace the phase grating mask 200 along the z axis, thereby changing its relative position with respect to the optical fiber 110. In particular, in this embodiment, the controller 340 regulates the piezoelectric device 330, so as to vibrate the phase grating mask 200 in the z-axis direction with respect to the optical fiber 110. This adjusts the refractive index modulation amplitude to be formed in the optical fiber 110. Preferably, at this time, the controller 340 regulates the waveform of vibration of the phase grating mask 200 according to the irradiation position z of the refractive index modulation inducing light UV. In this case, the refractive index modulation amplitude F(z) corresponds to the waveform of vibration of the phase grating mask 200 at each position z.

Therefore, even when the diffraction efficiency distribution of the phase grating mask 200 deviates from a desirable distribution, the refractive index modulation amplification F(z) may be adjusted such that the vibration amplitude of the phase grating mask 200 is regulated so as to cancel the influence of deviation, whereby the diffraction grating device device 100 having a desirable optical characteristic can be made easily.

Preferably, the controller 340 regulates the waveform of vibration of the phase grating mask 200 so as to make it become any of square, triangular, sinusoidal, and trapezoidal waves. When the waveform of vibration of the phase grating mask 200 has a fixed form as such, the refractive index modulation amplitude F(z) corresponds to the vibration amplitude of the phase grating mask 200 at each position z. Namely, controlling the vibration amplitude of the phase grating mask 200 according to each position z adjusts the refractive index modulation amplitude F(z).

The controller 340 may allow the vibration of the phase grating mask 200 to have any form. Preferably, in this case, the controller 340 closes the shutter 322 when the phase grating mask 200 is in transitional states of movement upon vibration, so as to prevent the optical fiber 110 from being irradiated with the refractive index modulation inducing light UV. As a consequence, the refractive index modulation amplitude F(z) is adjusted with a high accuracy.

Even when the controller 340 regulates the vibration waveform of the phase grating mask 200 so as to make it attain a square wave, it actually takes a certain fixed time for the phase grating mask 200 to move from one end to the other end. Therefore, it is preferable for the controller 340 to make the phase grating mask 200 attain a vibration period which is at least 20 times the time actually required for the phase grating mask 200 to move from one end to the other end. As a consequence, the refractive index modulation amplitude F(z) is adjusted with a high accuracy.

The apparatus 300 for making a diffraction grating device in accordance with this embodiment further comprises a light-receiving module 350 disposed such that the phase grating mask 200 is held between the light-receiving module 350 and the mirror 324. The light-receiving module 350 has light-receiving devices 351 to 353 for receiving zero-, (+) first-, and (−) first-order light components diffracted by the phase grating mask 200 and measuring their intensities, respectively. According to data measured by the light-receiving module 350, the controller 340 calculates a diffraction efficiency distribution of the phase grating mask 200. Thus, the light-receiving module 350 and the controller 340 constitute a diffraction efficiency distribution measuring means for measuring a diffraction efficiency distribution of the phase grating mask 200.

A method of making a diffraction grating device in accordance with an embodiment using the above-mentioned apparatus 300 for making a diffraction grating device will now be explained.

Figure 3:
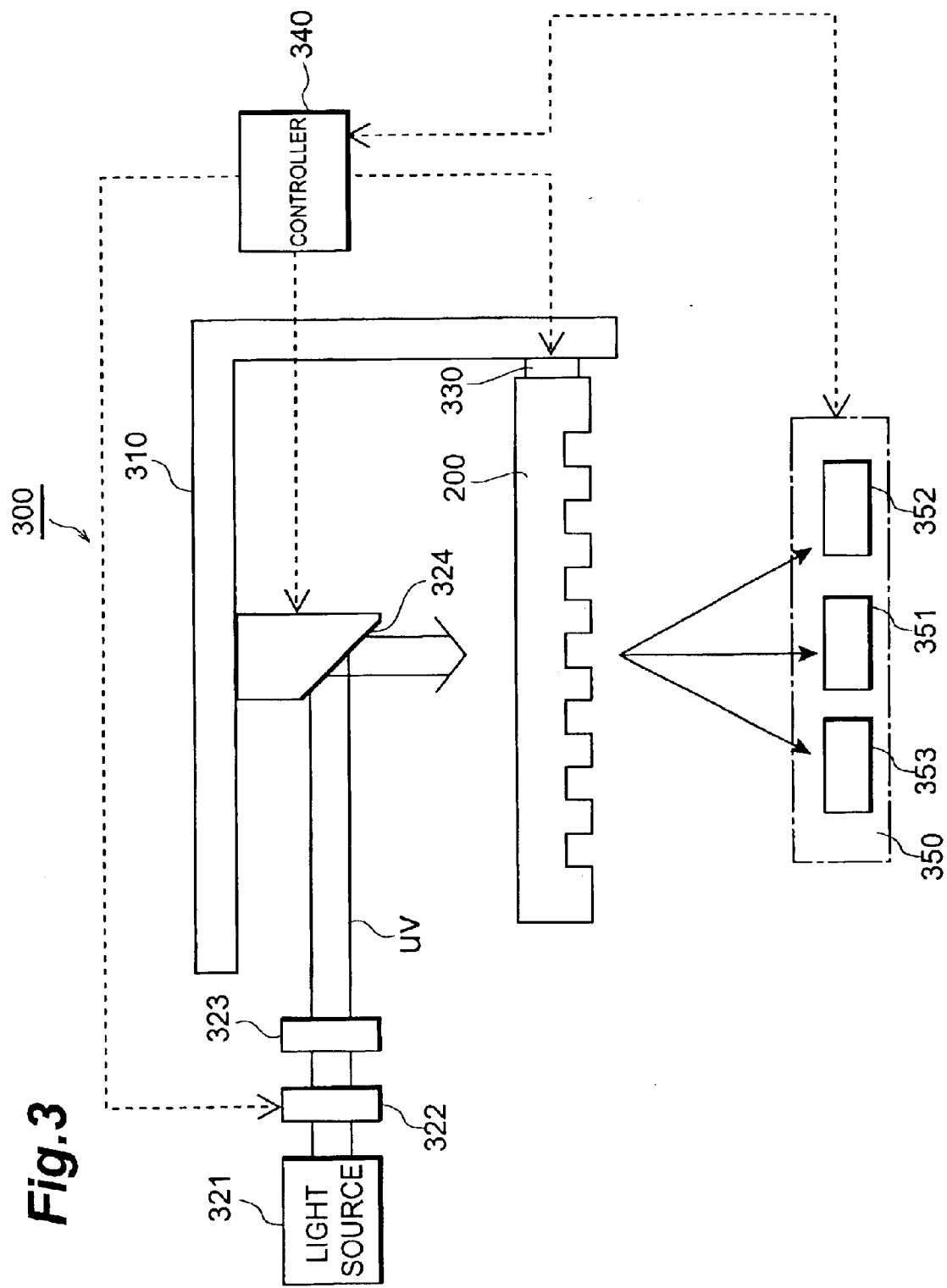
FIG. 3 is a view showing how the diffraction efficiency distribution of a phase grating mask is measured.

First, in a state where the optical fiber 110 is not disposed between the phase grating mask 200 and the light-receiving module 350, as shown in FIG. 3, the phase grating mask 200 is scanned with the refractive index modulation inducing light UV, so as to measure a diffraction efficiency distribution of the phase grating mask 200.

The refractive index modulation inducing light UV outputted from the light source 321 is made incident on the mirror 324 by way of the shutter 322 and optical system 323. Then, the refractive index modulation inducing light UV is reflected by the mirror 324, so as to become incident on the phase grating mask 200. At this time, the diffracting action of the phase grating mask 200 having a grating spacing 2Λ generates (+) and (−) first-order light components in addition to the zero-order light component, which are received by their corresponding light-receiving devices 351 to 353 of the light-receiving module 350. According to data from the light-receiving module 350, the controller 340 calculates the diffraction efficiency on the phase grating mask 200 at this position. As the mirror 324 moves over a predetermined area in the z-axis direction, the phase grating mask 200 is scanned with the refractive index modulation inducing light UV. As a consequence, the diffraction efficiency on the phase grating mask 200 is calculated at each position, whereby the diffraction efficiency distribution in the whole phase grating mask 200 is measured.

Subsequently, as shown in FIG. 2, the optical fiber 110 is disposed between the phase grating mask 200 and the light-receiving module 350, so as to form the diffraction grating 113 in the refractive index modulation forming area of the optical fiber 110.

The refractive index modulation inducing light UV outputted from the light source 321 is made incident on the mirror 324 by way of the shutter 322 and optical system 323, and then is reflected by the mirror 324, so as to irradiate the optical fiber 110 by way of the phase grating mask 200. At that time, the diffracting action of the phase grating mask 200 having a grating spacing 2Λ generates (+) and (−) first-order light components, which interfere with each other, thereby generating interference fringes with a fringe spacing Λ. Also, as the mirror 324 moves over a predetermined area in the z-axis direction, the position at which the optical fiber 110 is irradiated with the refractive index modulation inducing light UV by way of the phase grating mask 200 is scanned. Then, the core region 111 of the optical fiber 110 is formed with a refractive index modulation having a grating spacing Λ according to the spatial distribution of optical energy in thus formed interference fringes, whereby the diffraction grating 113 is formed.

Upon movement of the mirror 324 and irradiation with the refractive index modulation inducing light UV, the phase grating mask 200 is vibrated with a predetermined amplitude in the z-axis direction with respect to the optical fiber by an action of the piezoelectric device 330 according to the diffraction efficiency distribution of the phase grating mask 200. Suppose that the phase grating mask 200 having a grating spacing 2Λ is vibrating in the z-axis direction with respect to the optical fiber 110 whereas the waveform of vibration is a square wave whose probability of existence is ½ each at positions (z+a) and (z−a) where z is the center position of vibration.

Then, the refractive index distribution n(z) of the diffraction grating 113 formed upon irradiation with the refractive index modulation inducing light UV is represented by the following expression (2):

$$n(z) = n_0 + \frac{1}{2}\Delta n_0 \left[\cos\left(\frac{2\pi}{\Lambda}(z-a)\right) + \cos\left(\frac{2\pi}{\Lambda}(z+a)\right)\right] \quad (2)$$

$$= n_0 + \Delta n_0 \cdot \cos\left(\frac{2\pi}{\Lambda}a\right) \cdot \cos\left(\frac{2\pi}{\Lambda}z\right)$$

whereas the amplitude F(z) of refractive index modulation is represented by the following expression (3):

$$F(z) = \Delta n_0 \cdot \cos\left(\frac{2\pi}{\Lambda}a\right) \quad (3)$$

where a is the vibration amplitude of the phase grating mask 200, and $\Delta n_0$ is the coefficient of value corresponding to the irradiation amount (=irradiation intensity×irradiation time) of refractive index modulation inducing light UV.

Figure 4:
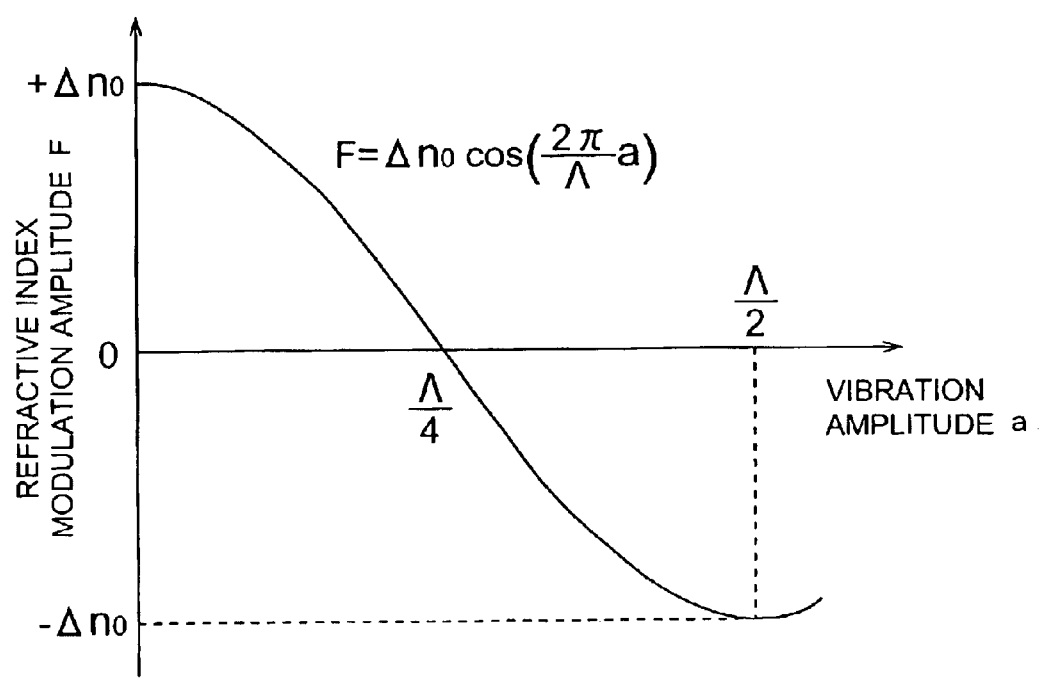
FIG. 4 is a graph showing a relationship between the vibration amplitude of a phase grating mask and the refractive index modulation amplitude.
Figure 5A:
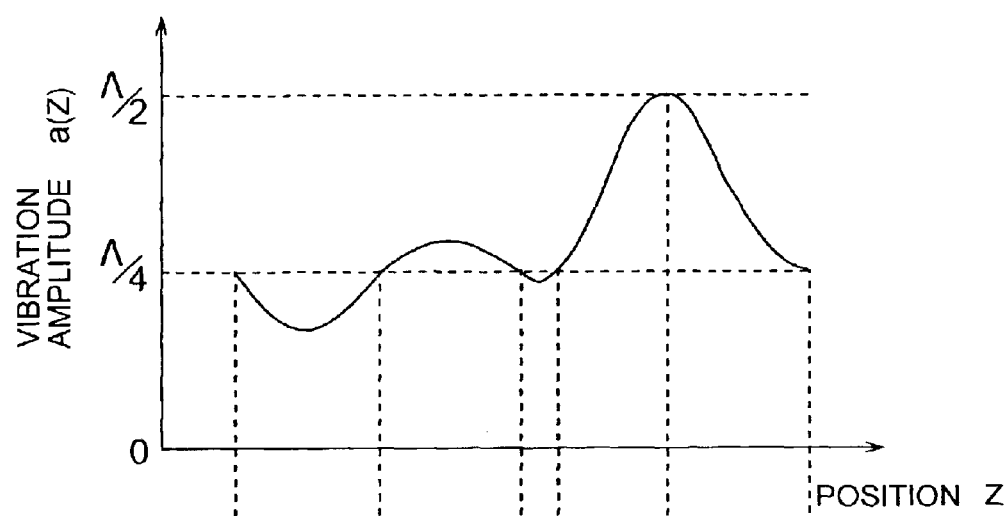
Figure 5B:
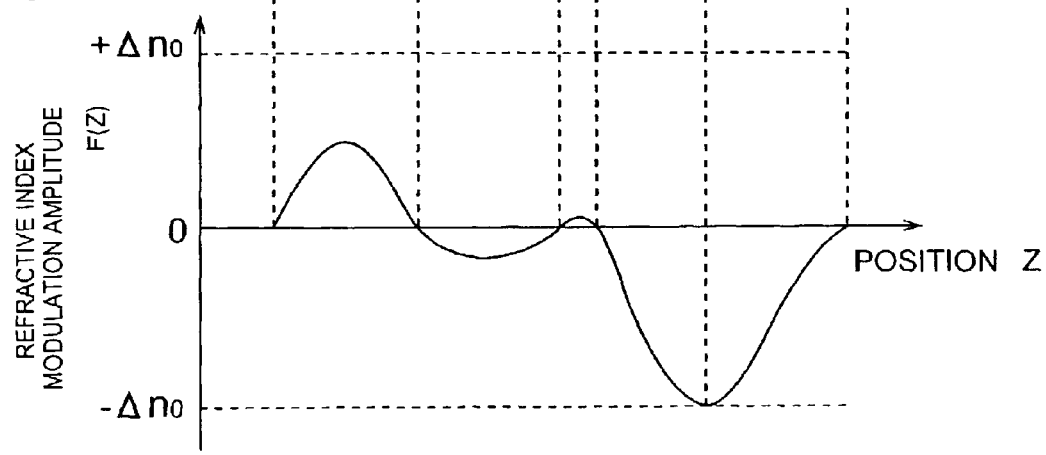
FIG. 5B is a graph showing the refractive index modulation amplitude obtained when the vibration amplitude of the phase grating mask is such that shown in FIG. 5A.

The third factor ($\cos(2\pi z/\Lambda)$) in the second term of the right side in the above-mentioned expression (2) indicates that the grating spacing in the diffraction grating 113 is $\Lambda$. As shown in FIG. 4, the refractive index modulation inducing light F(z) in the above-mentioned expression (3) is a function of the vibration amplitude a of the phase grating mask 200, and becomes a value corresponding to the amplitude a. Therefore, the refractive index modulation amplitude F(z) can be adjusted when the vibration amplitude a of the phase grating mask 200 is controlled appropriately. Hence, for attaining the refractive index modulation amplitude F (z) shown in FIG. 5B, it will be sufficient if the vibration amplitude a(z) of the phase grating mask 200 at each position z is regulated as shown in FIG. 5A according to the above-mentioned expression (3).

Thus, the refractive index modulation amplitude F(z) can be adjusted arbitrarily when the vibration amplitude a(z) of the phase grating mask 200 is controlled. Therefore, a diffraction grating having a desirable characteristic can be made when the refractive index modulation amplitude F(z) is adjusted so as to cancel the deviation from a desirable distribution according to the measured diffraction efficiency distribution of the phase grating mask 200.

For obtaining such a refractive index modulation amplitude F(z), the optical system 323 is used such that the refractive index modulation inducing light UV incident on the phase grating mask 200 preferably attains a luminous flux width of 500 $\mu$m or less (more preferably 100 $\mu$m or less) in the z-axis direction. Preferably, the mirror 324 is moved at a constant speed in the z-axis direction. As the mirror 324 moves at a constant speed (i.e., the irradiation position z of refractive index modulation inducing light UV is scanned), the phase grating mask 200 vibrates along the z axis with a vibration amplitude a(z) according to the irradiation position z. If the intensity of refractive index modulation inducing light UV and the scanning speed of its irradiation position z are constant, the average effective refractive index of the optical fiber 110 in the refractive index modulation forming area becomes uniform along the z axis.

Figure 6A:
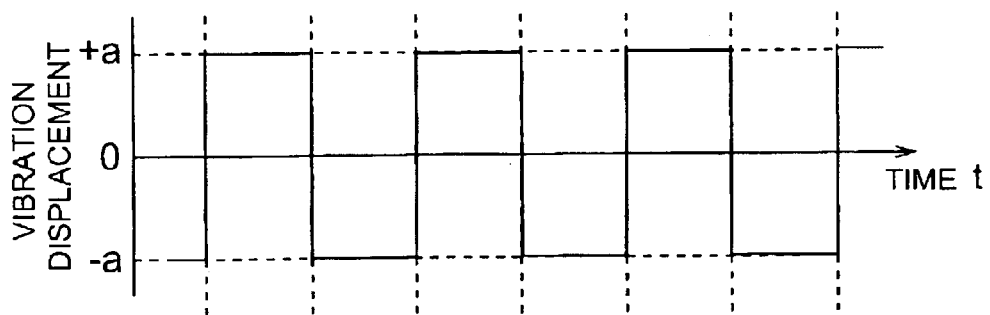
Figure 6B:
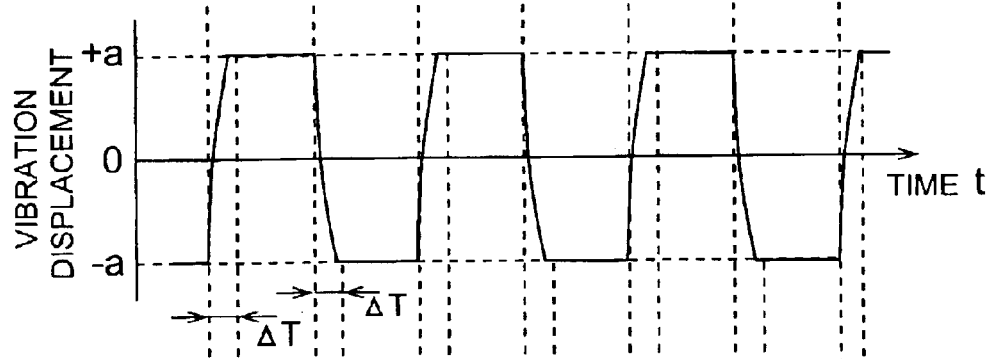
Figure 6C:
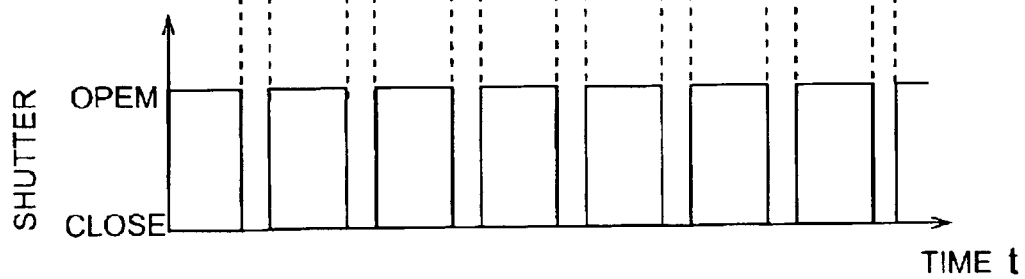
FIG. 6C is a graph indicating the opening and closing of a shutter.

The foregoing explanations assume an ideal case where the waveform of vibration of the phase grating mask 200 is a square wave as shown in FIG. 6A whereas each of the respective probabilities of displacement being +a and −a is ½. In practice, however, it takes a certain fixed time $\Delta T$ (e.g., several milliseconds to several tens of milliseconds) for the waveform to shift from one end (where the displacement is +a) to the other end (where the displacement is −a) and vice versa as shown in FIG. 6B. If this transition time $\Delta T$ is not negligible, the refractive index modulation formed according to the above-mentioned expression (3) may become inaccurate. Therefore, as shown in FIG. 6C, the shutter 322 is closed during the above-mentioned transition time $\Delta T$ in which the phase grating mask 200 is in a transitional state of movement upon vibration, so that the optical fiber 110 is not irradiated with the refractive index modulation inducing light UV. Alternatively, the period T of vibration of the phase grating mask 200 is made so as to become at least 20 times the above-mentioned transition time $\Delta T$, so that the transition time $\Delta T$ is shorter than the period T to such an extent that it is negligible. This can accurately adjust the refractive index modulation amplitude F(z).

Figure 7A:
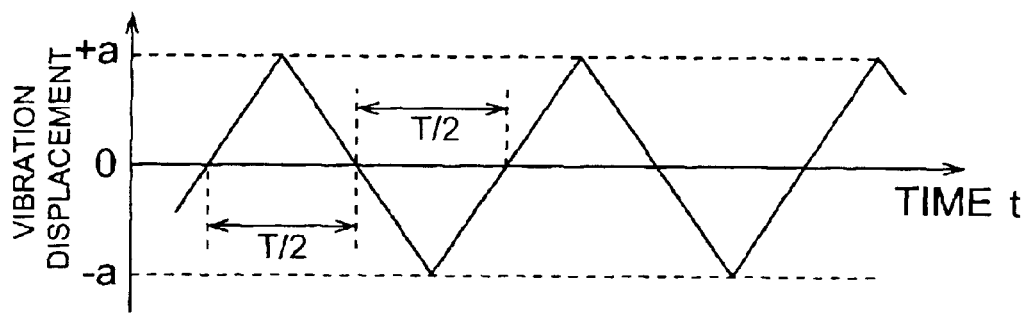
FIGS. 7A to 7C are graphs showing other specific examples of vibration waveforms of the phase grating mask.
Figure 7B:
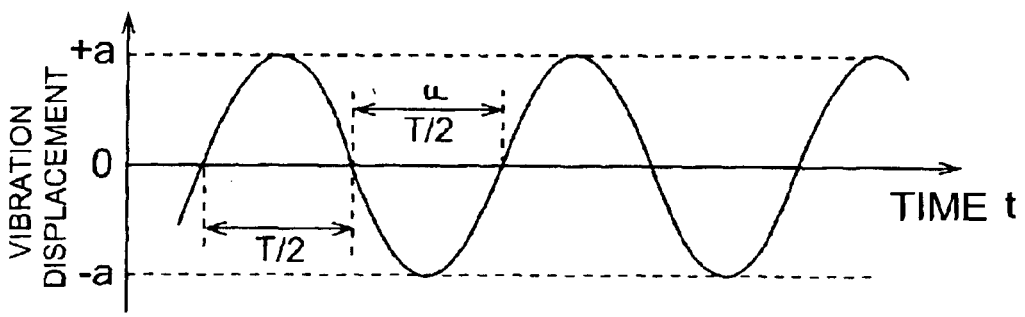
Figure 7C:
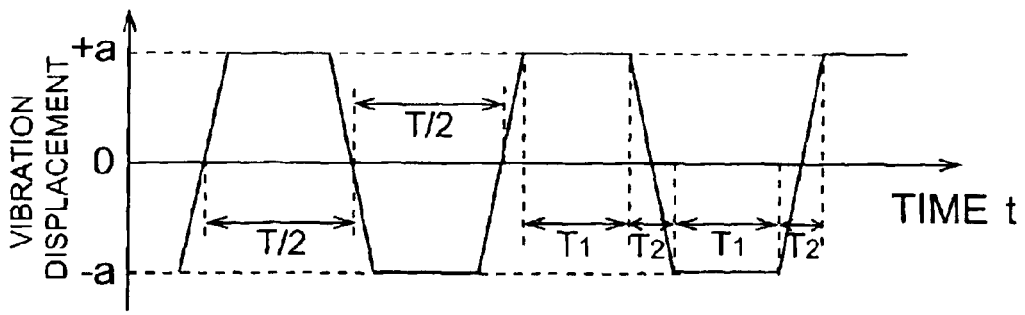

The waveforms shown in FIGS. 7A to 7C are also preferable as the vibration of the phase grating mask 200. When the vibration of the phase grating mask 200 has a triangular waveform as shown in FIG. 7A, the diffraction grating 113 formed in the optical fiber 110 has a refractive index distribution n(z) represented by the following expression (4):

$$n(z) = n_0 + \alpha_1 \int_{-T/4}^{T/4} \cos\left(\frac{2\pi}{\Lambda}\left(z - \frac{4\alpha}{T}t\right)\right)dt \quad (4)$$

$$= n_0 + F_1(z) \cdot \cos\left(\frac{2\pi}{\Lambda}z\right)$$

whereas the amplitude distribution $F_1(z)$ of refractive index modulation is represented by the following expression (5):

$$F_1(z) = \Delta n_1 \frac{\Lambda}{a} \sin\left(\frac{2\pi}{\Lambda}a\right) \quad (5)$$

where $\alpha_1$ and $\Delta n_1$ are fixed coefficients.

When the vibration of the phase grating mask 200 has a sinusoidal waveform as shown in FIG. 7B, the diffraction grating 113 formed in the optical fiber 110 has a refractive index distribution n(z) represented by the following expression (6):

$$n(z) = n_0 + \alpha_2 \int_{-T/2}^{T/2} \cos\left(\frac{2\pi}{\Lambda}\left[z - a \cdot \sin\left(\frac{2\pi}{T}t\right)\right]\right)dt \quad (6)$$

$$= n_0 + F_2(z) \cdot \cos\left(\frac{2\pi}{\Lambda}z\right)$$

whereas the amplitude distribution $F_2(z)$ of refractive index modulation is represented by the following expression (7):

$$F_2(z) = \Delta n_2 \int_0^{T/2} \cos\left(\frac{2\pi}{\Lambda}a \cdot \sin\left(\frac{2\pi}{T}t\right)\right)dt \quad (7)$$

where $\alpha_2$ and $\Delta n_2$ are fixed coefficients.

When the vibration of the phase grating mask 200 has a trapezoidal waveform as shown in FIG. 7C, the amplitude distribution of refractive index modulation is represented by an expression obtained as a weighted mean of the above-mentioned expressions (3) and (5) which is in conformity to the ratio between the time $T_1$ in which the displacement is at the position +a or −a and the transition time $T_2$ between these two positions.

Thus, when the vibration of the phase grating mask 200 has a fixed waveform, the refractive index modulation amplitude F(z) conforms to the amplitude a of vibration of the phase grating mask 200 at each position z. Namely, when the amplitude a of vibration of the phase grating mask 200 is controlled according to each position z, the refractive index modulation amplitude F(z) is adjusted.

Figure 8:
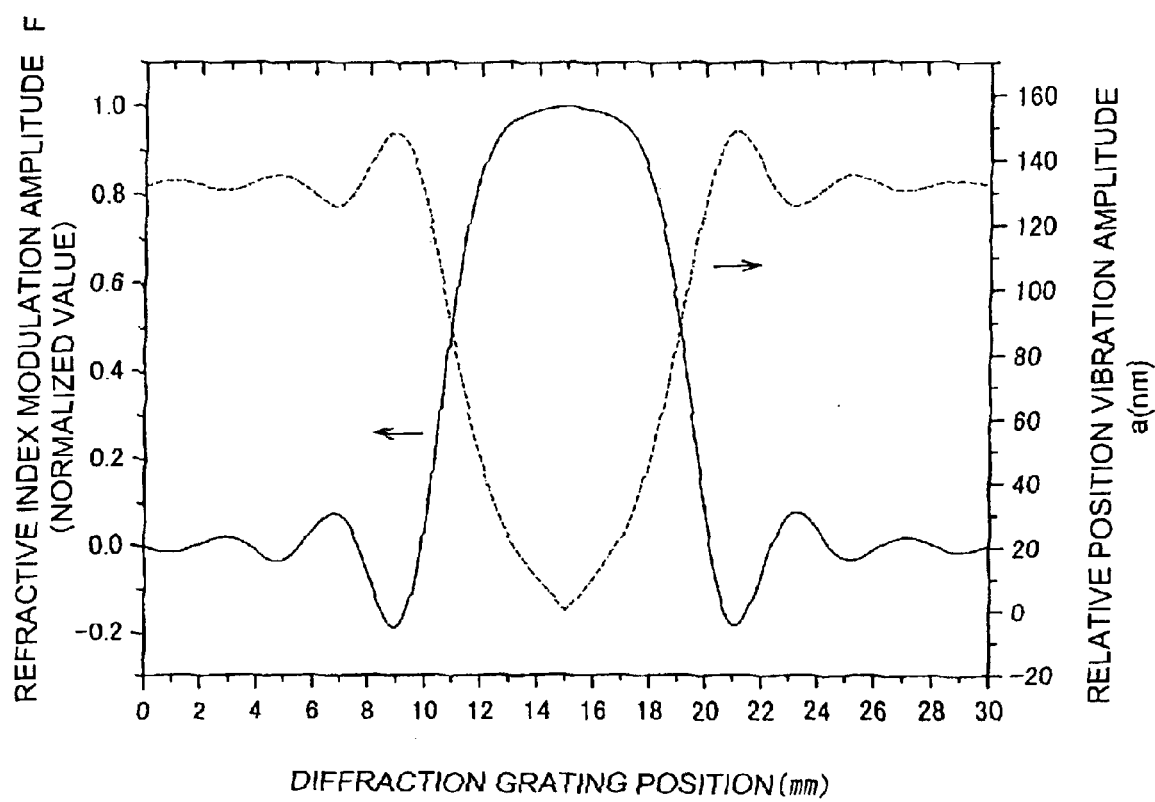
FIG. 8 is a graph showing a designed target refractive index modulation amplitude and the vibration amplitude of the phase grating mask at this time.

In order for the refractive index modulation amplitude F(z) to be a function of position z, it will be preferred if the luminous flux width 2w of refractive index modulation inducing light UV in the z-axis direction is smaller. Hence, the relationship between the luminous flux width 2w of refractive index modulation inducing light UV and the actually realized refractive index modulation amplitude will now be explained. Here, it is assumed that the vibration of the phase grating mask 200 has a square waveform, the scanning speed of the irradiation position of refractive index modulation inducing light UV is constant, and the intensity of refractive index modulation inducing light UV is uniform within the luminous flux width 2w. Suppose a case where the phase grating mask 200 vibrates in conformity to the vibration amplitude a(z) indicated by the broken line in FIG. 8 so as to form the refractive index modulation amplitude distribution F(z) indicated by the solid line in the same graph. The vibration amplitude a(z) of the phase grating mask 200 is obtained according to the above-mentioned expression (3).

Figure 9:
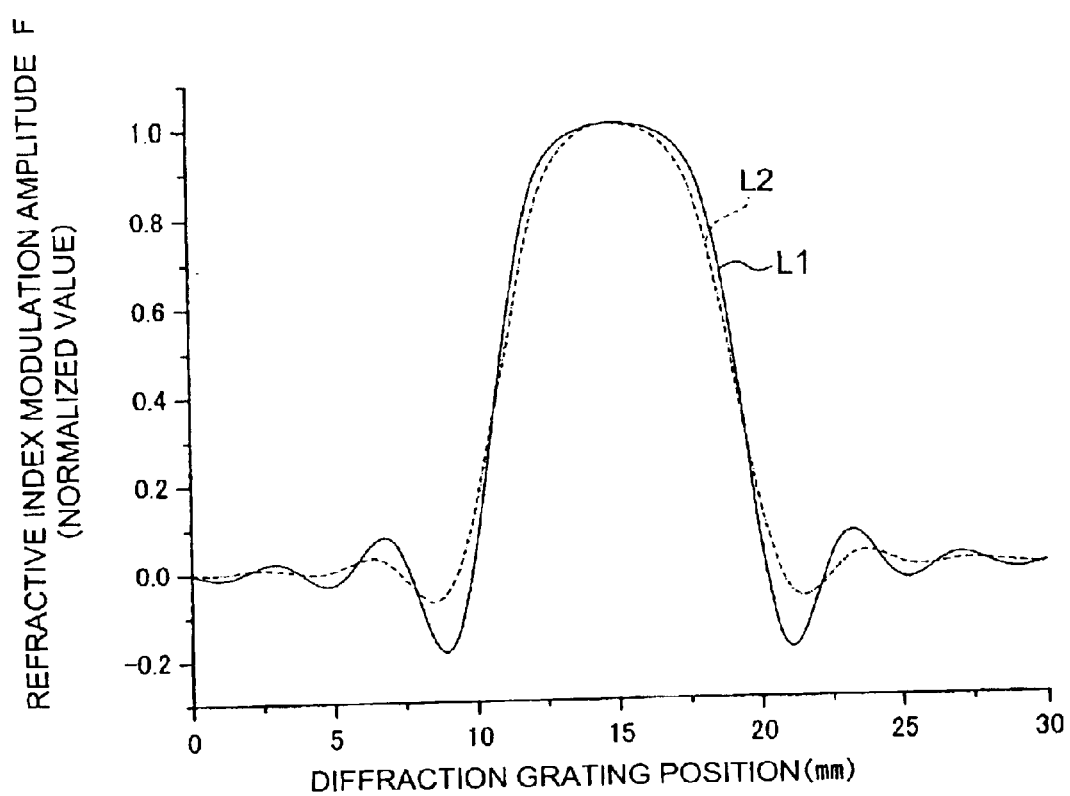
FIG. 9 is a graph showing a designed value of refractive index modulation amplitude (solid line) and the refractive index modulation amplitude (broken line) at a luminous flux width $2w$ of 3 mm.
Figure 10:
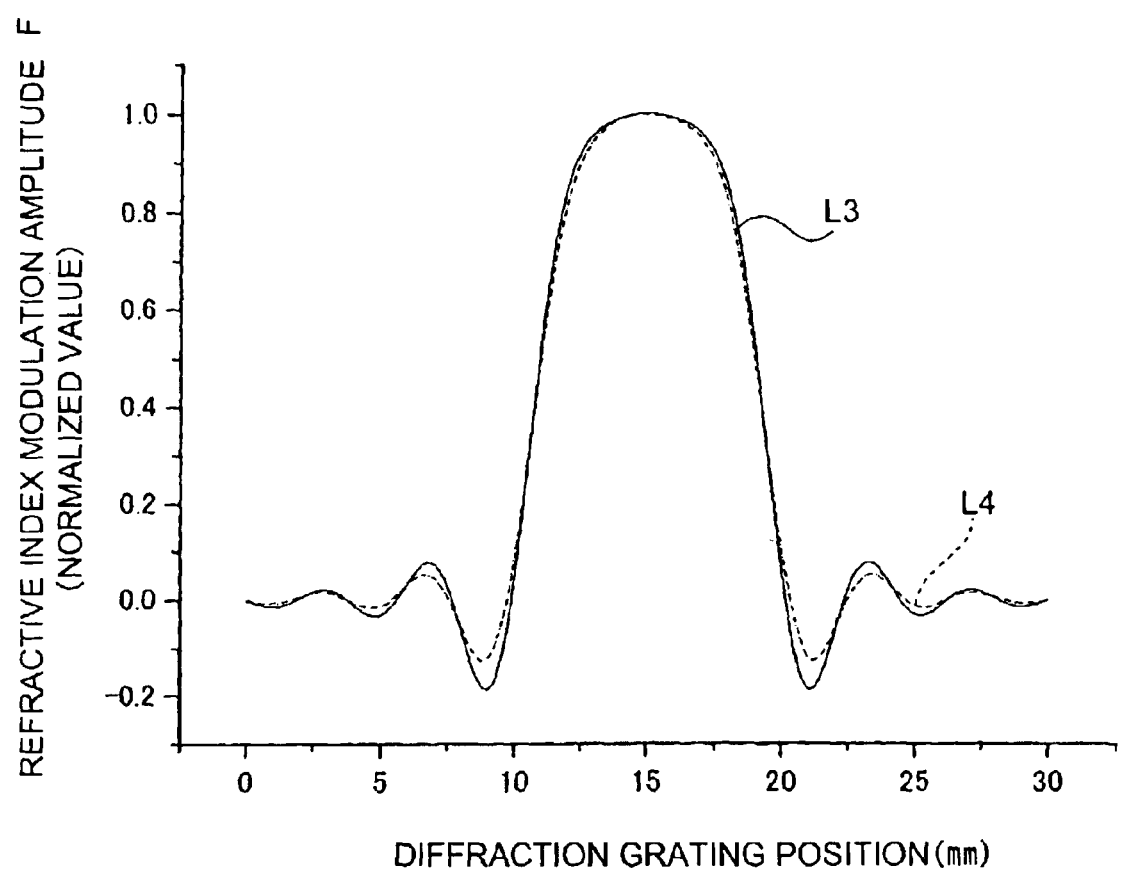
FIG. 10 is a graph showing a designed value of refractive index modulation amplitude (solid line) and the refractive index modulation amplitude (broken line) at a luminous flux width $2w$ of 2 mm.
Figure 11:
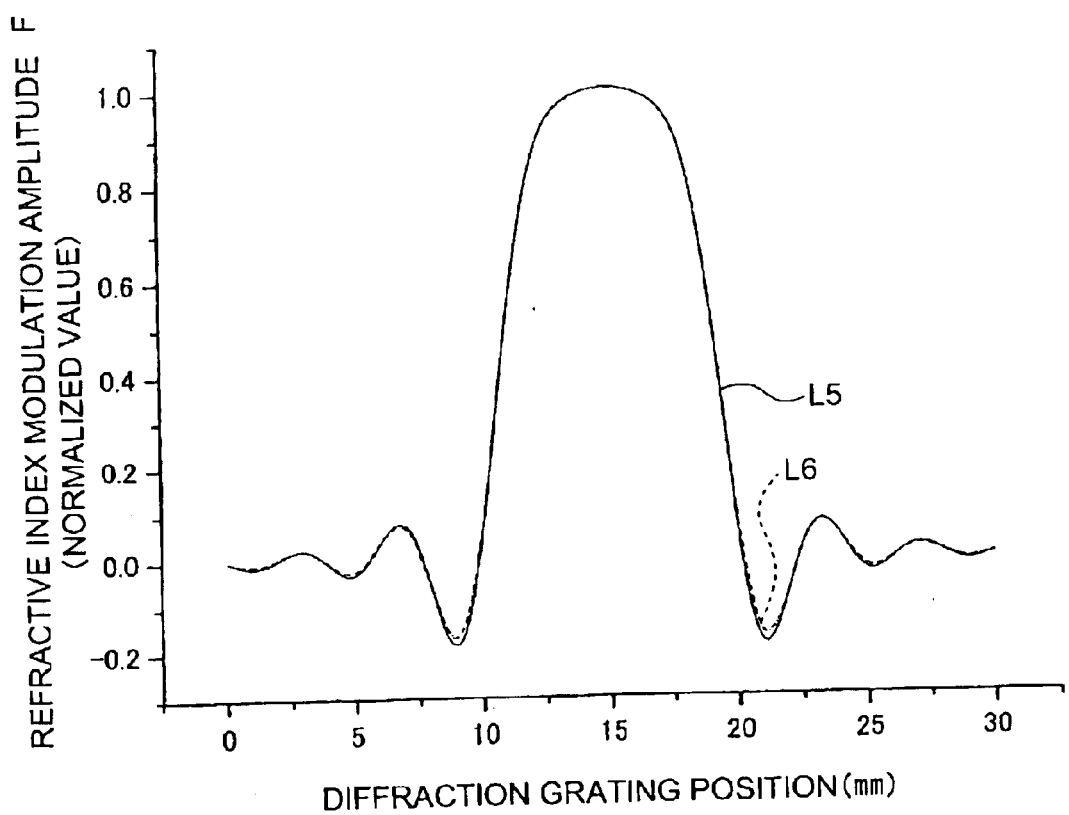
FIG. 11 is a graph showing a designed value of refractive index modulation amplitude (solid line) and the refractive index modulation amplitude (broken line) at a luminous flux width $2w$ of 1 mm.
Figure 12:
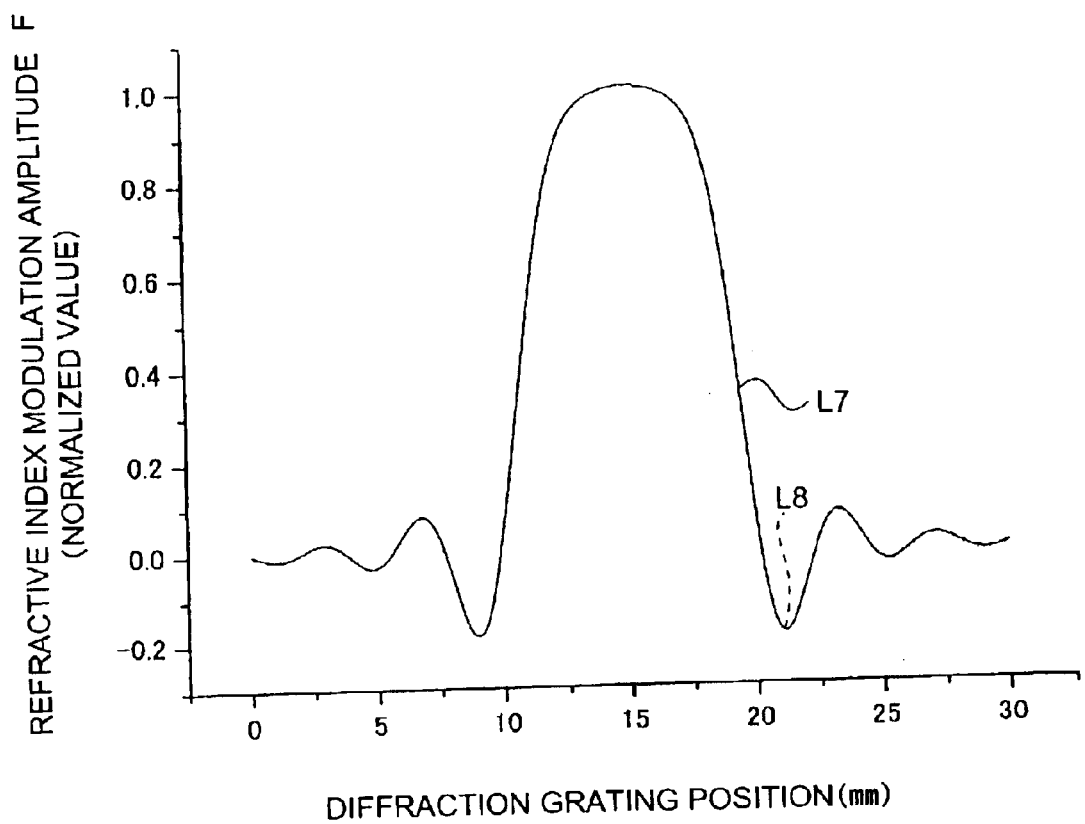
FIG. 12 is a graph showing a designed value of refractive index modulation amplitude (solid line) and the refractive index modulation amplitude (broken line) at a luminous flux width $2w$ of 0.5 mm.

The position z is irradiated with the refractive index modulation inducing light UV during a period in which the center irradiation position of refractive index modulation inducing light UV moves from z−w to z+w. Therefore, during when the center irradiation position of refractive index modulation inducing light UV moves from z−w to z+w, the refractive index modulation amplitude actually realized at each position z is under the influence of the vibration amplitude a(z) of the phase grating mask 200. Namely, the refractive index modulation amplitude realized depends on the luminous flux width 2w of refractive index modulation inducing light UV. FIG. 9 is a graph showing a designed value of refractive index modulation amplitude (solid line L1) and the refractive index modulation amplitude (solid line L2) obtained when the luminous flux width 2w is 3 mm. FIG. 10 is a graph showing a designed value of refractive index modulation amplitude (solid line L3) and the refractive index modulation amplitude (solid line L4) obtained when the luminous flux width 2w is 2 mm. FIG. 11 is a graph showing a designed value of refractive index modulation amplitude (solid line L5) and the refractive index modulation amplitude (solid line L6) obtained when the luminous flux width 2w is 1 mm. FIG. 12 is a graph showing a designed value of refractive index modulation amplitude (solid line L7) and the refractive index modulation amplitude (solid line L8) obtained when the luminous flux width 2w is 0.5 mm. As can be seen from these graphs, the difference between the refractive index modulation amplitude realized and the designed value becomes smaller as the luminous flux width 2w of refractive index modulation inducing light UV decreases. When the luminous flux width 2w of refractive index modulation inducing light UV is 0.5 mm or less, the difference between the refractive index modulation amplitude realized and the designed value is so small that it is negligible.

Thus, the refractive index modulation amplitude realized becomes closer to the designed value as the luminous flux width 2w of refractive index modulation inducing light UV is smaller. If the density of intensity of refractive index modulation inducing light UV is constant, however, the irradiation time of refractive index modulation inducing light UV at each position will become shorter as the luminous flux width 2w of refractive index modulation inducing light UV is smaller, thus yielding a smaller amount of irradiation. As a consequence, the irradiation position scanning speed is required to slow down, whereby it takes a longer time to make the optical waveguide diffraction grating device 100.

Therefore, a technique by which the refractive index modulation amplitude realized can be made closer to the designed value even when the luminous flux width 2w of refractive index modulation inducing light UV is large will now be explained. Here, it is assumed that the scanning speed of irradiation position of the refractive index modulation inducing light UV is constant, whereas the intensity of refractive index modulation inducing light UV is uniform within the luminous flux width 2w. Let the following relational expression (8):

$$f = G(\alpha) \tag{8}$$

hold between the vibration amplitude a of the phase grating mask 200 and the refractive index modulation amplitude f in an ideal case where the luminous flux width 2w is very small. In this case, the refractive index modulation amplitude F(z) realized at each position z is represented by the following expression (9):

$$F(z) = C \int_{z-w}^{z+w} f(z_1) dz_1 = C \int_{z-w}^{z+w} G(a(z_1)) dz_1 \tag{9}$$

where C is a constant.

Figure 13:
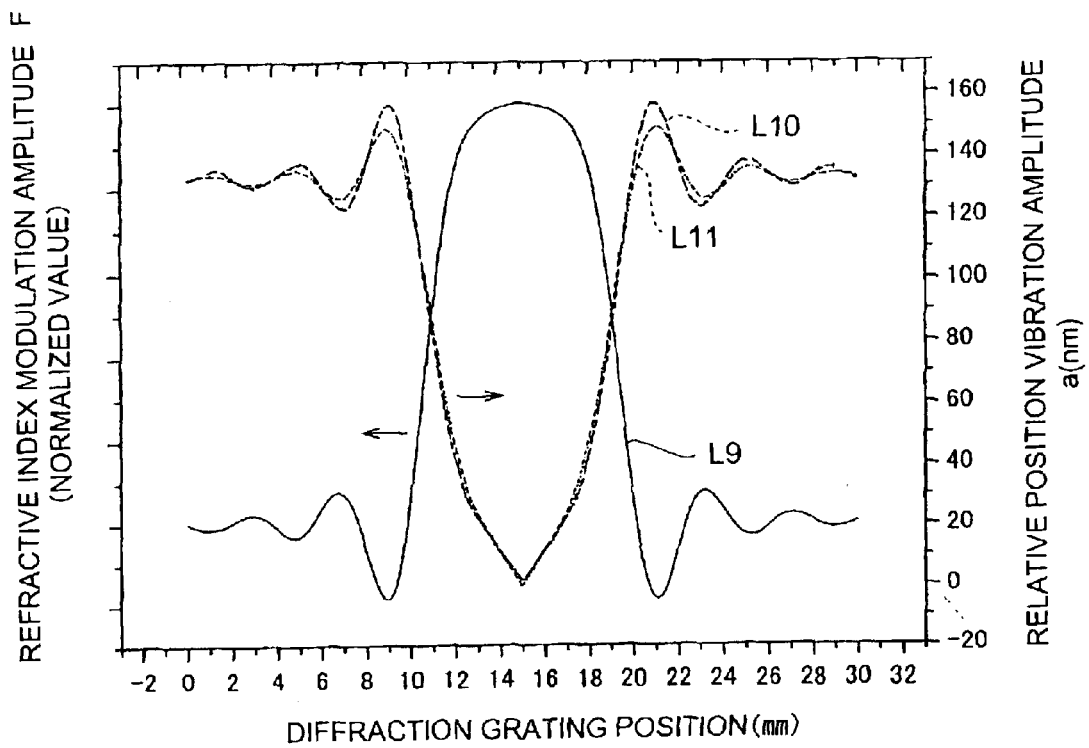
FIG. 13 is a graph showing a designed target of refractive index modulation amplitude distribution (solid line), the vibration amplitude of the phase grating mask obtained according to expression (9) (broken line), and the vibration amplitude obtained without regard to expression (9) (dotted line)
Figure 14:
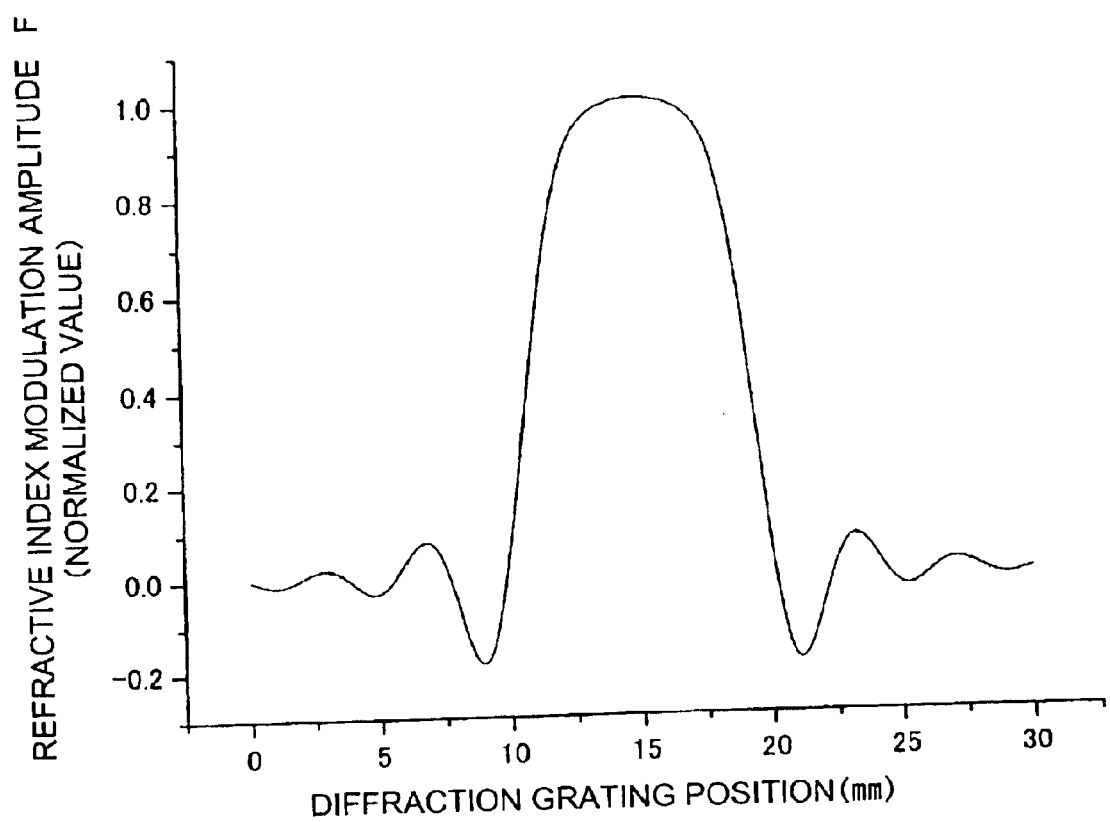
FIG. 14 is a graph showing the refractive index modulation amplitude realized when the phase grating mask is vibrated according to the vibration amplitude obtained in view of expression (9)

Then, the vibration amplitude a(z) of the phase grating mask 200 is appropriately designed such that the refractive index modulation amplitude F(z) represented by expression (9) attains a designed value. When the vibration amplitude a(z) of the phase grating mask 200 is designed as such, the refractive index modulation amplitude realized approaches the designed value. FIG. 13 is a graph showing a designed value of refractive index modulation amplitude distribution (solid line L9), the vibration amplitude (broken line L10) obtained according to the above-mentioned expression (9), and the vibration amplitude (broken line L11) obtained without regard to the above-mentioned expression (9). FIG. 14 is a graph showing the refractive index modulation amplitude realized when the phase grating mask 200 vibrates in conformity to the vibration amplitude obtained according to the above-mentioned expression (9). Here, the luminous flux width 2w of refractive index modulation inducing light UV was 2 mm. FIG. 10 shows the refractive index modulation amplitude realized when the phase grating mask 200 vibrates in conformity to the vibration amplitude obtained without regard to the above-mentioned expression (9). As can be seen when FIGS. 10 and 14 are compared with each other, the refractive index modulation amplitude realized when the phase grating mask 200 vibrates in conformity to the vibration amplitude obtained according to the above-mentioned expression (9) is closer to the designed value.

In the foregoing explanation, the intensity of refractive index modulation inducing light UV is assumed to be uniform within the luminous flux width 2w. In practice, however, the intensity of refractive index modulation inducing light UV is not uniform but has a certain distribution (e.g., Gaussian distribution). Therefore, a case where the intensity of refractive index modulation inducing light UV has a distribution within the luminous flux width 2w will now be explained. Suppose that the intensity distribution of refractive index modulation inducing light UV within the luminous flux width 2w is represented by $P(z_1)$ with respect to the distance $z_1$ from the center irradiation position along the z axis. The refractive index modulation amplitude F(z) realized at each position z is represented by the following expression (10):

$$F(z) = C \int_{z-w}^{z+w} P(z - z_1) G(a(z_1)) dz_1 \tag{10}$$

Then, the vibration amplitude a(z) of the phase grating mask 200 is appropriately set such that the refractive index modulation amplitude F(z) represented by expression (10) attains a designed value. When the vibration amplitude a (z) of the phase grating mask 200 is designed as such, the refractive index modulation amplitude realized approaches the designed value.

Figure 15A:
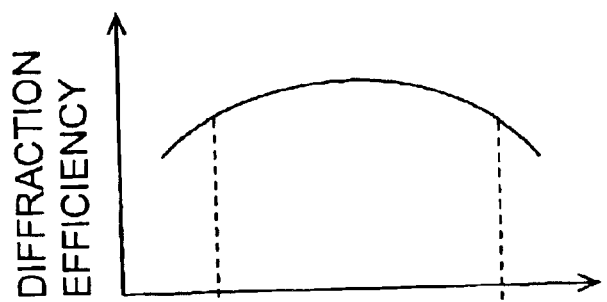
FIGS. 15A, 16A, and 17A are graphs showing diffraction efficiency distributions of phase grating masks in first to third cases, respectively.
Figure 15B:
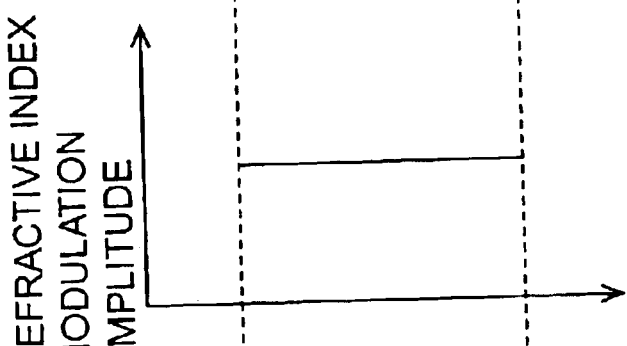
FIGS. 15B, 16B, and 17B are graphs showing refractive index modulation amplitudes in the first to third cases, respectively.
Figure 15C:
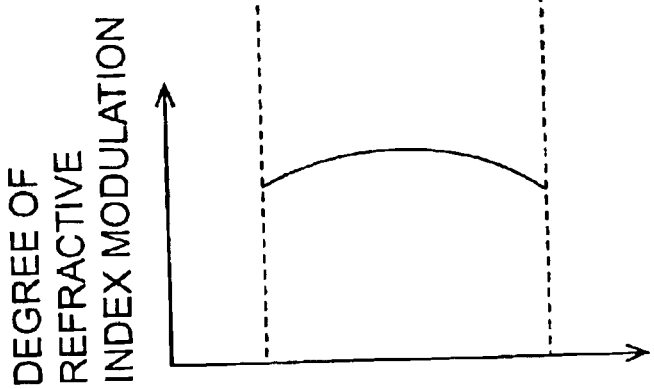
FIGS. 15C, 16C, and 17C are graphs showing actual degrees of refractive index modulation in the first to third cases, respectively.
Figure 16A:
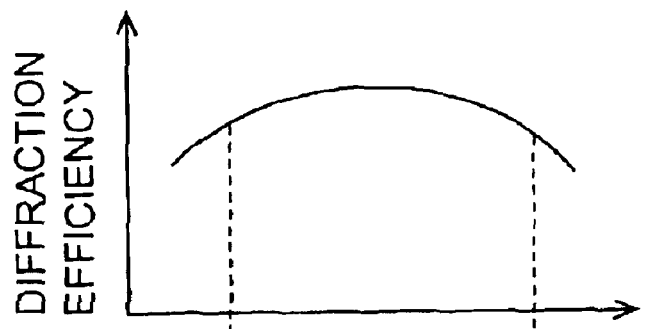
Figure 16B:
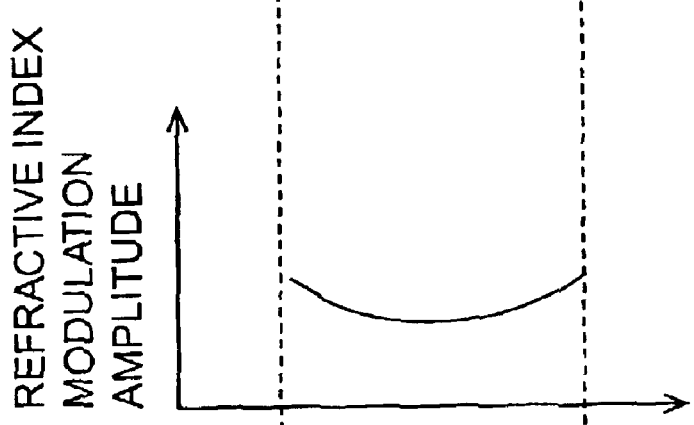
Figure 16C:
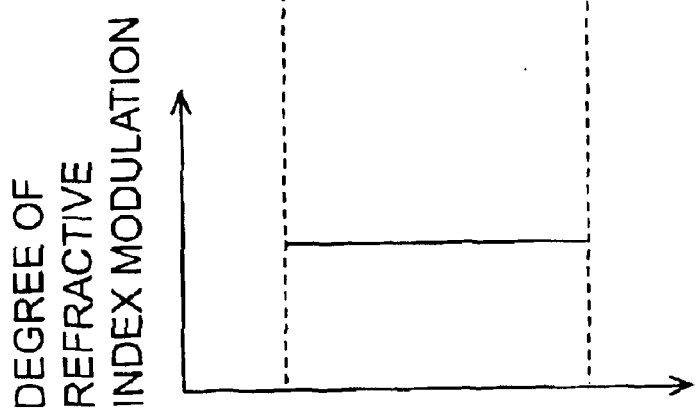
Figure 17A:
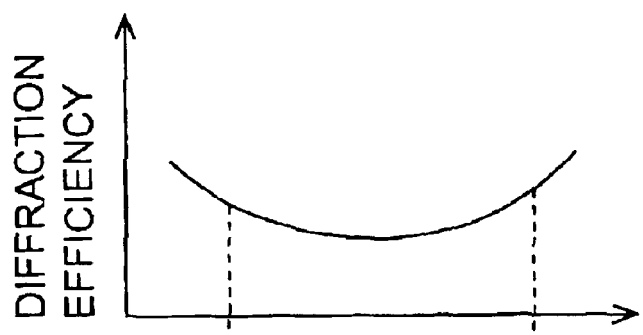
Figure 17B:
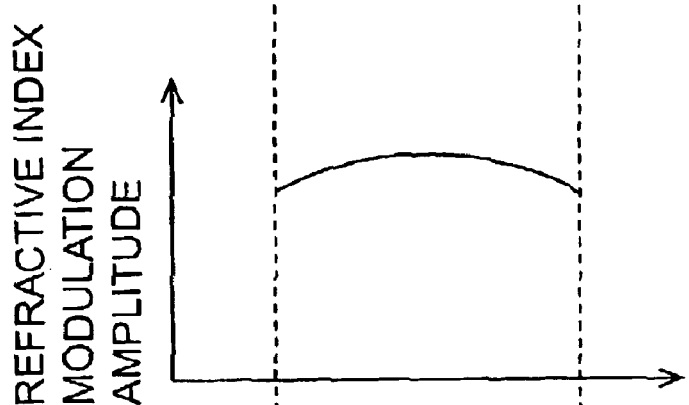
Figure 17C:
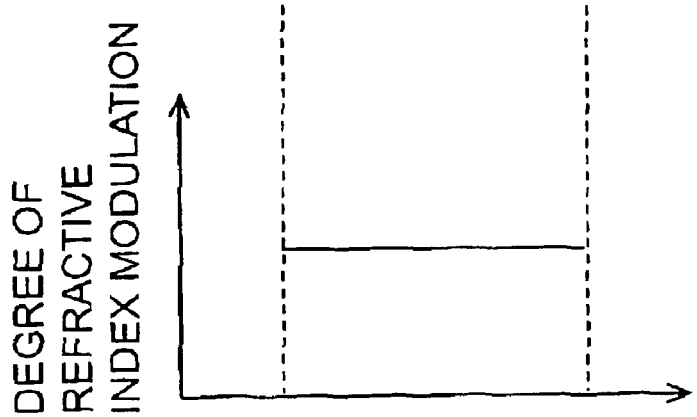

FIGS. 15A, 16A, and 17A are graphs showing respective diffraction efficiency distributions of the phase grating mask 200 in first to third cases. FIGS. 15B, 16B, and 17B are graphs showing respective refractive index modulation amplitudes adjusted by vibrations of the phase grating mask 200. FIGS. 15C, 16C, and 17C are graphs showing respective actual degrees of refractive index modulation in the optical waveguide region of the optical fiber 110.

In the first case, as shown in FIG. 15A, the diffraction efficiency is the highest in the vicinity of the longitudinal center of the phase grating mask 200 and decreases toward peripheries. Here, unless relative positions of the phase grating mask 200 and optical fiber 110 are changed, the refractive index modulation amplitude becomes longitudinally uniform as shown in FIG. 15B. Consequently, as shown in FIG. 15C, the actual degree of refractive index modulation in the optical waveguide region of the optical fiber 110 is the highest in the vicinity of the longitudinal center and decreases toward peripheries, thus becoming uneven.

In the second case, as shown in FIG. 16A, the diffraction efficiency of the phase grating mask 200 is the highest in the vicinity of the longitudinal center and decreases toward peripheries. Unlike the first case, however, the phase grating mask 200 is relatively vibrated with a predetermined amplitude with respect to the optical fiber 110 according to the diffraction efficiency distribution in the second case, whereby the refractive index modulation amplitude is adjusted so as to cancel the diffraction efficiency distribution of the phase grating mask 200. Namely, as shown in FIG. 16B, the refractive index modulation amplitude is adjusted so as to become the smallest in the vicinity of the longitudinal center and increase toward peripheries. Therefore, as shown in FIG. 16C, the actual degree of refractive index modulation in the optical waveguide region of the optical fiber 110 becomes longitudinally uniform.

In the third case, as shown in FIG. 17A, the diffraction efficiency of the phase grating mask 200 is the lowest in the vicinity of the longitudinal center and increases toward peripheries. The phase grating mask 200 is relatively vibrated with respect to the optical fiber 110 according to the diffraction efficiency distribution in the third case as well, whereby the refractive index modulation amplitude is adjusted so as to cancel the diffraction efficiency distribution of the phase grating mask 200. Namely, as shown in FIG. 17B, the refractive index modulation amplitude is adjusted so as to become the largest in the vicinity of the longitudinal center and decreases toward peripheries. Therefore, as shown in FIG. 17C, the actual degree of refractive index modulation in the optical waveguide region of the optical fiber 110 becomes longitudinally uniform.

In this embodiment, as in the foregoing, a diffraction efficiency distribution of the phase grating mask 200 is initially measured, and the vibration amplitude of the phase grating mask 200 is regulated according to thus measured diffraction efficiency distribution of the phase grating mask 200, so as to adjust the refractive index modulation amplitude, whereby a refractive index modulation is formed in the optical waveguide region of the optical fiber 110. As a consequence, even when the diffraction efficiency distribution of the phase grating mask 200 deviates from a desirable distribution, the influence of deviation is canceled out, whereby a diffraction grating device having a desirable optical characteristic can be made.

In the above-mentioned embodiment, the phase grating mask 200 is vibrated in order to adjust the refractive index modulation amplitude. However, even without vibrating the phase grating mask 200, the refractive index modulation forming area may be scanned with refractive index modulation inducing light for a plurality of times, so as to change relative positions of the phase grating mask 200 and optical fiber 110 upon scanning such that the amount of fluctuation in the relative positions at an odd-numbered scan and the amount of fluctuation in the relative positions at an even-numbered scan are made symmetrical to each other about the center of fluctuation of relative positions, whereby the refractive index modulation amplitude can be adjusted as with the case where the phase grating mask 200 is vibrated.

Figure 18:
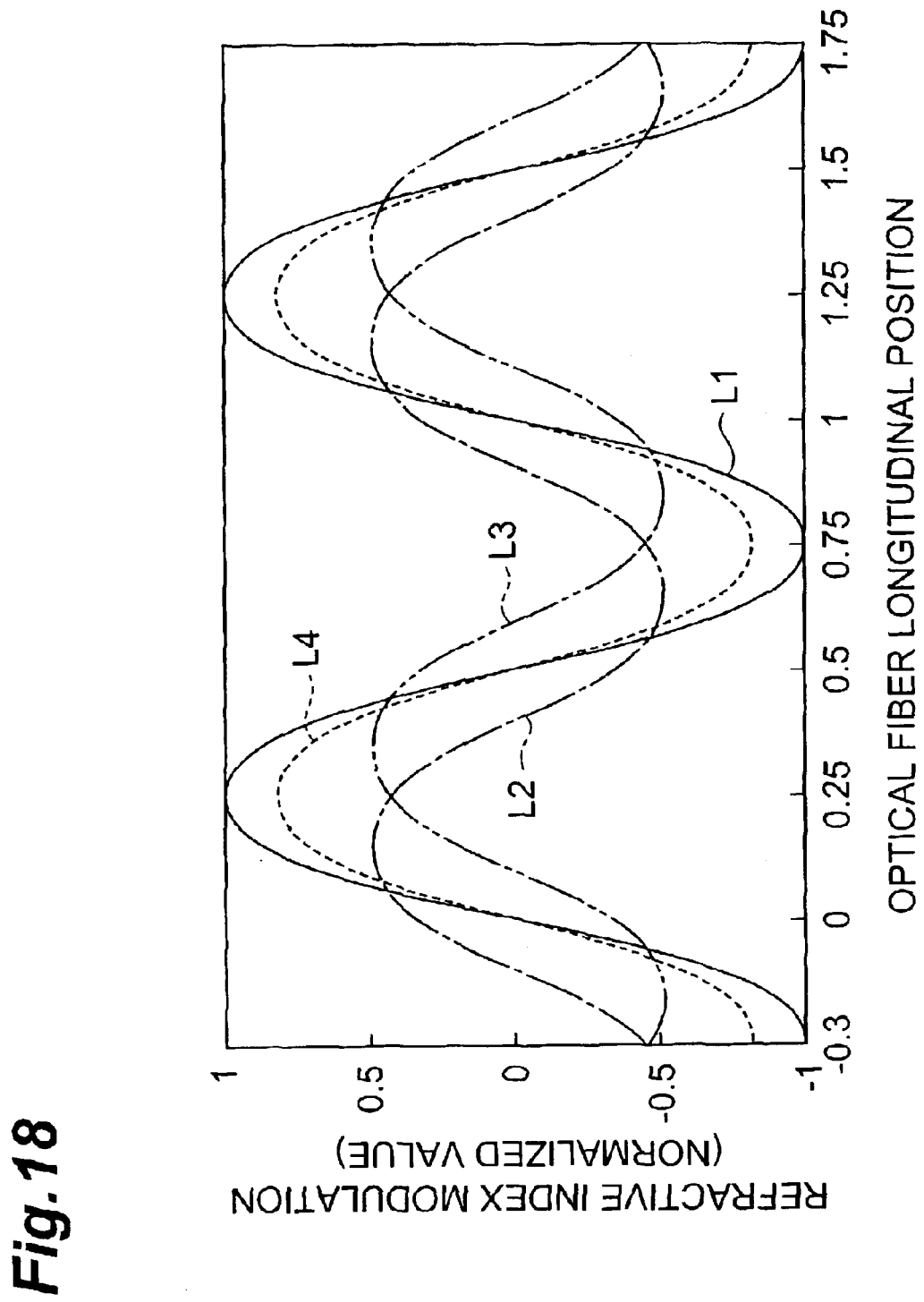
FIG. 18 is a graph showing how refractive index is modulated when the relative position of a phase grating mask with respect to an optical fiber is changed and not.

FIG. 18 is a graph showing how refractive index is modulated when the relative position of the phase grating mask 200 with respect to the optical fiber 110 is changed and not. In FIG. 18, L1 indicates how refractive index is modulated when the relative position is not changed, whereas L2 and L3 show how refractive index is modulated when the relative position of the phase grating mask 200 with respect to the optical fiber 110 is changed by −A and +A (where A is a given constant), respectively. L4 shows how refractive index is modulated when the phase grating mask is actually vibrated with an amplitude of ±A, which substantially equals the curve formed by adding L2 and L3 together. Since the duty cycle of each of L2 and L3 is one-half that of L1, their degree of refractive index modulation is one-half that of L1, and their phases shift in the z-axis direction.

As can be seen from FIG. 18, the refractive index modulation represented by L4 is obtained when the phase grating mask 200 is vibrated with an amplitude of ±A. However, the curve indicated by L4 substantially equals the curve formed by adding L2 and L3 together. As a consequence, even without vibrating the phase grating mask 200, the refractive index modulation forming area may be scanned with refractive index modulation inducing light for a plurality of times, so as to change relative positions of the phase grating mask 200 and optical fiber 110 upon scanning such that the amount of fluctuation in the relative positions at an odd-numbered scan and the amount of fluctuation in the relative positions at an even-numbered scan are made symmetrical to each other about the center of fluctuation of relative positions, whereby the refractive index modulation amplitude can be adjusted as with the case where the phase grating mask 200 is vibrated.

Figure 19:
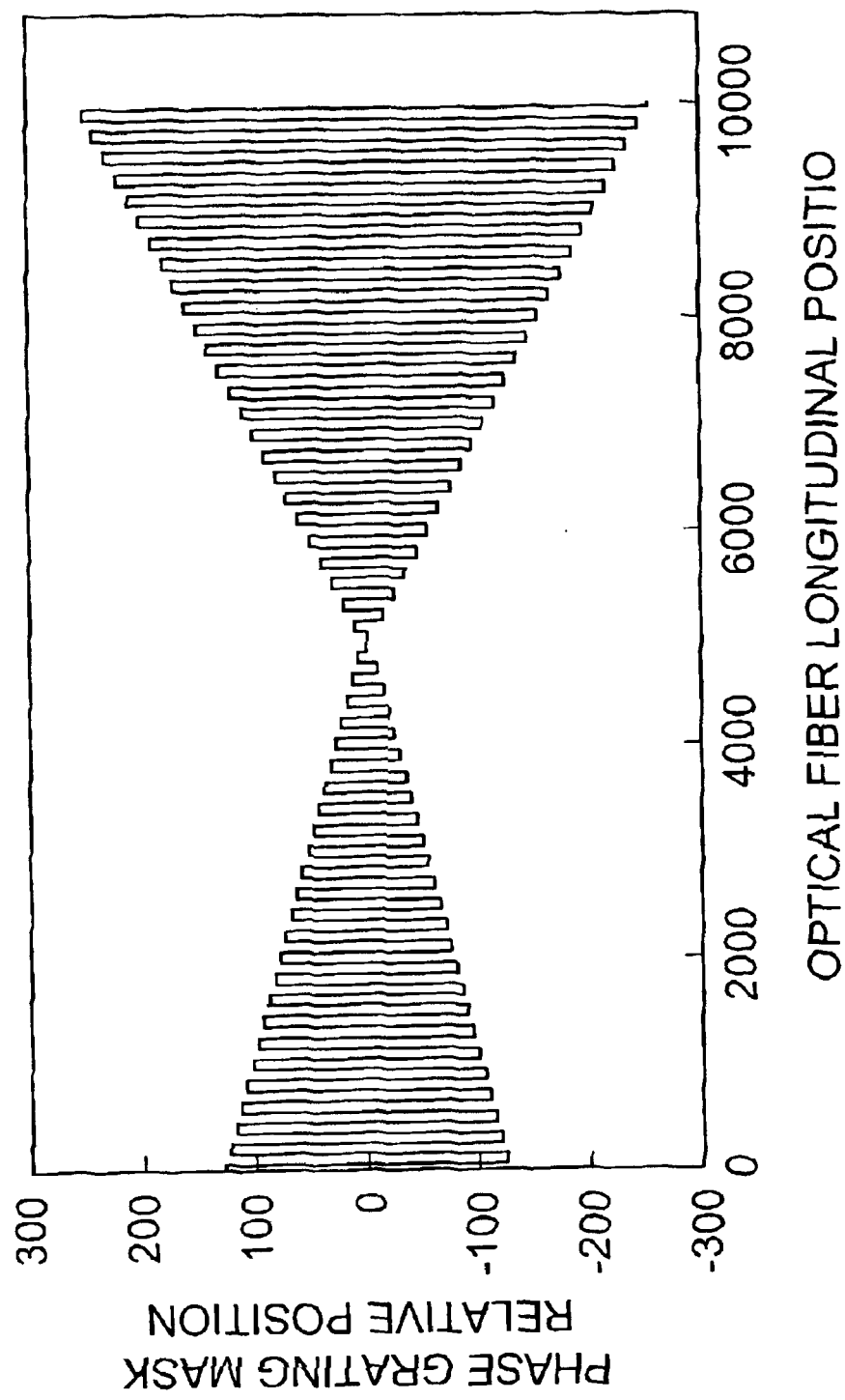
FIG. 19 is a graph showing an example of cases where a phase grating mask is vibrated with a predetermined amplitude at each position in z-axis direction (longitudinal direction) of an optical fiber.
Figure 20:
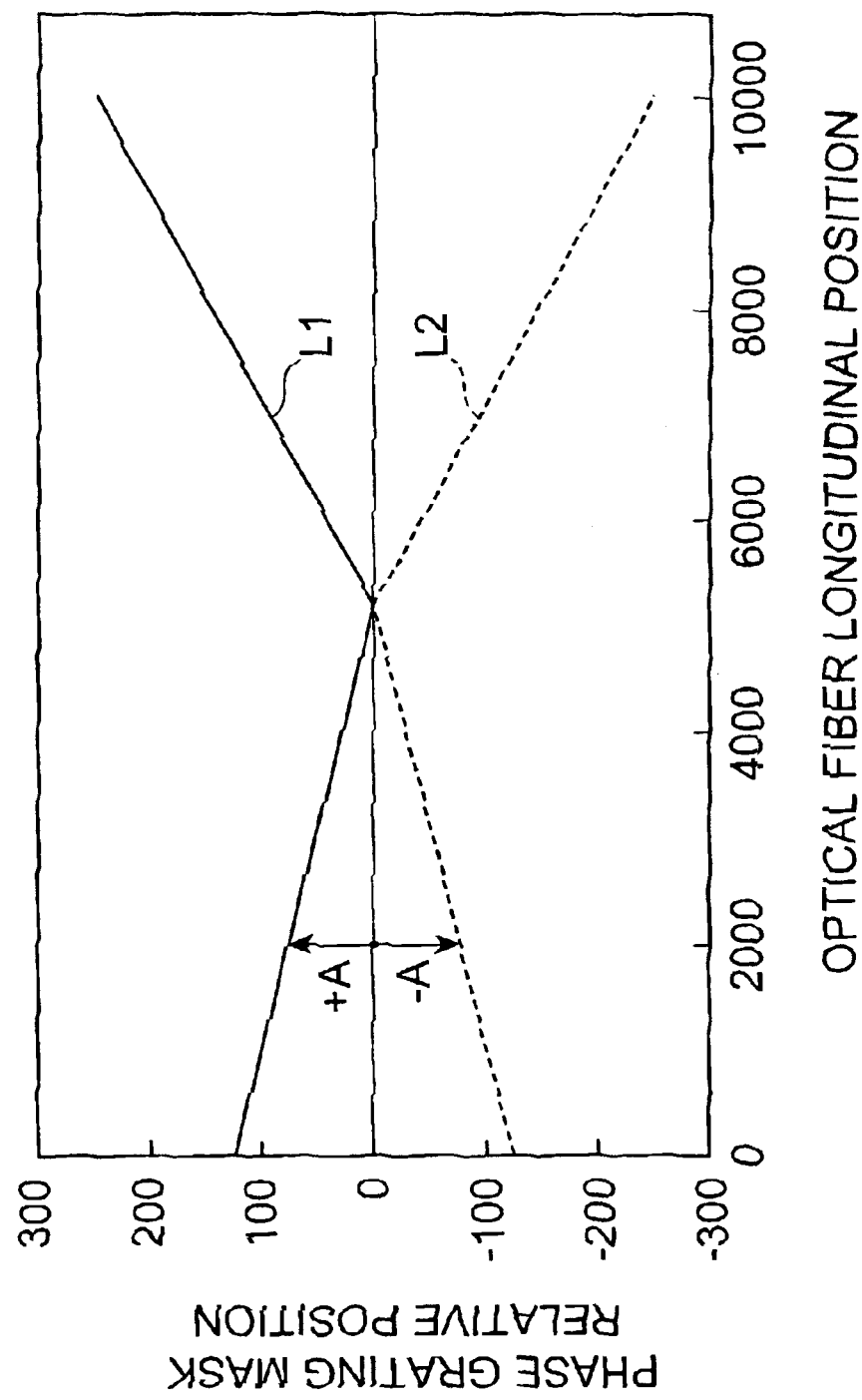
FIG. 20 is a graph for explaining how relative positions of a phase grating mask and an optical fiber are changed upon a plurality of scans such that the amount of fluctuation A in the relative positions obtained at odd-numbered scans (solid line L1) and that obtained at even-numbered scans (broken line L2) are symmetrical about a fluctuation center at each position in the z-axis direction, so as to adjust the amplitude of refractive index modulation.

Explained by way of example in the following is a case where the phase grating mask 200 is vibrated with a predetermined amplitude at each position of the optical fiber 110 in the z-axis direction (longitudinal direction) as shown in FIG. 19 in order to realize a desirable refractive index modulation amplitude more reliably. In this case, even without vibrating the phase grating mask 200, the refractive index modulation forming area may be scanned with refractive index modulation inducing light for a plurality of times, so as to change relative positions of the phase grating mask 200 and optical fiber 110 upon scanning such that the amount of fluctuation A in the relative positions at odd-numbered scans (solid line L1) and that at even-numbered scans (broken line L2) are made symmetrical to each other about the center of fluctuation of relative positions at each position in the z-axis direction as shown in FIG. 20, whereby the refractive index modulation amplitude can be adjusted as with the case where the phase grating mask 200 is vibrated. For attaining a desirable refractive index modulation amplitude, the total number of scans is preferably an even number. Typically, an even number of scans within the range of 30 to 50 is carried out.

Figure 21:
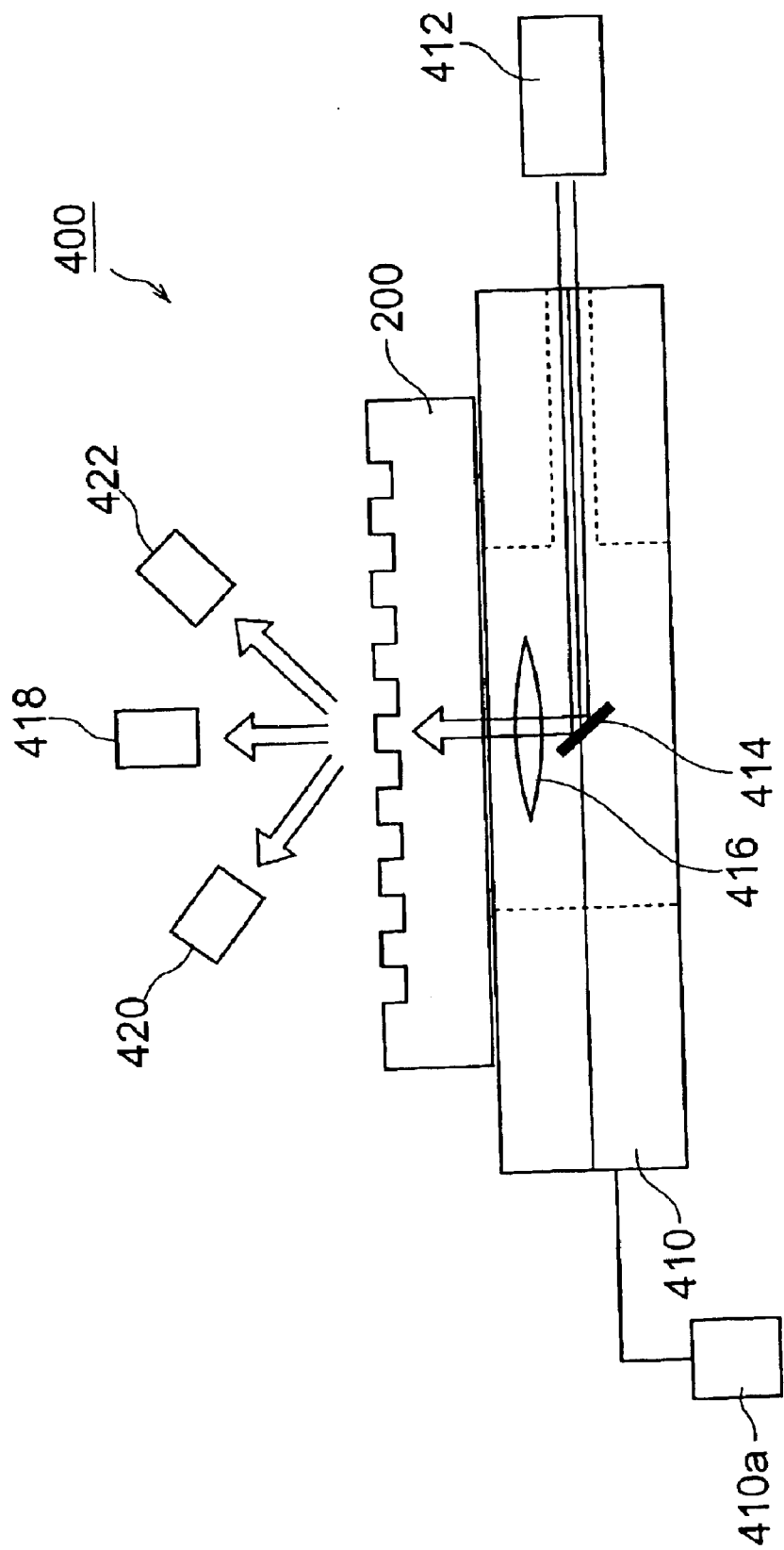
FIG. 21 is a diagram schematically showing a diffraction efficiency distribution measuring apparatus for measuring the diffraction efficiency distribution of a phase grating mask.

Though the diffraction efficiency distribution of the phase grating mask 200 in the above-mentioned embodiment is measured by using the light-receiving module 350 of the apparatus 300 for making a diffraction grating device shown in FIG. 1, a diffraction efficiency distribution measuring apparatus 400 provided independently therefrom may be used for measurement. FIG. 21 is a schematic diagram of the diffraction efficiency distribution measuring apparatus 400 for measuring the diffraction efficiency distribution of the phase grating mask 200.

The diffraction efficiency distribution measuring apparatus 400 comprises a stage 410 mounting the phase grating mask 200 thereon and having a motor 410a for moving the phase grating mask 200; a mirror 414 for causing the refractive index modulation inducing light outputted from a laser light source 412 to become incident on the phase grating mask 200; a condenser lens 416; and light-receiving devices 418, 420, and 422 for measuring the respective intensities of zero-, (+)first-, and (−) first-order light components generated upon diffraction by the phase grating mask 200.

In the diffraction efficiency distribution measuring apparatus 400, the refractive index modulation inducing light outputted from the laser light source 412 is reflected by the mirror 414 and converged by the condenser lens 416, so as to irradiate the phase grating mask 200 mounted on the stage 410. Then, the respective intensities of the zero-, (+)first-, and (−) first-order light components generated upon irradiation of the phase grating mask 200 with the refractive index modulation inducing light are measured by the light-receiving devices 418, 420, and 422. Measuring the respective intensities of diffracted light components while moving the phase grating mask 200 by the stage 410 determines the diffraction efficiency distribution of the phase grating mask 200.

The diffraction efficiency distribution measuring apparatus 400 may use a laser light source other than the laser light source 412 outputting refractive index modulation inducing light, and determine the diffraction efficiency distribution of the phase grating mask 200 at the wavelength of refractive index modulation inducing light according to the diffraction efficiency distribution of the phase grating mask 200 measured by the former laser light source.

When the diffraction efficiency distribution of the phase grating mask 200 is measured by the independently provided diffraction efficiency distribution measuring apparatus 400 as such, the light-receiving module 350 provided in the apparatus 300 for making a diffraction grating device shown in FIG. 1 can be omitted.

Embodiments of an optical add/drop module equipped with the diffraction grating device in accordance with the above-mentioned embodiment will now be explained. The diffraction grating device included in the add/drop module of each of the embodiments explained in the following is the diffraction grating device 100 in accordance with the above-mentioned embodiment, and can selectively reflect a multitude of wavelengths of light. In the following, the diffraction grating device 100 is assumed to reflect wavelengths $\lambda_{2m}$ of light but transmit wavelengths $\lambda_{2m+1}$ of light therethrough. Here, m is an integer of at least 1 but not greater than M, whereas M is an integer of at least 2, and each wavelength satisfies the following relational expression (14):

$$\lambda_1 < \lambda_2 < \lambda_3 < \ldots < \lambda_{2M-1} < \lambda_{2M} \quad (14)$$

Figure 22:
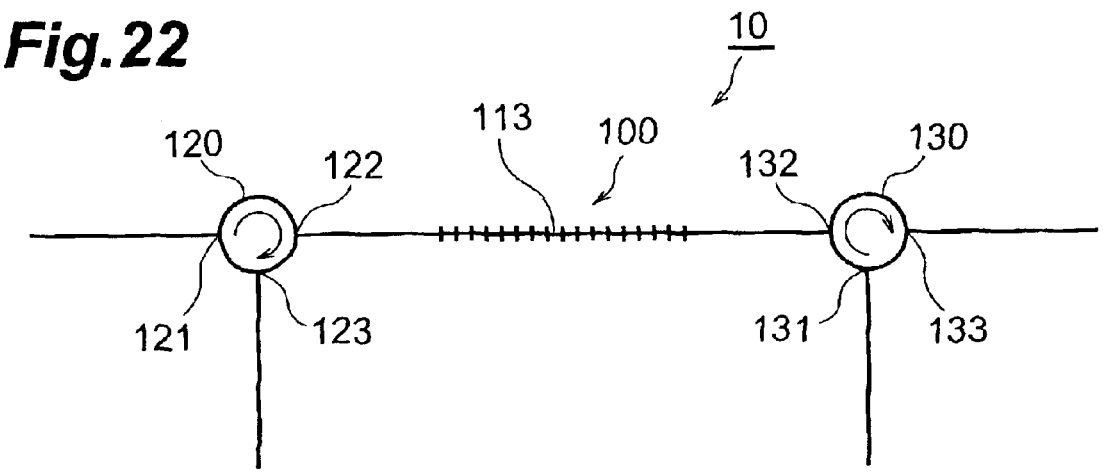
FIGS. 22 to 24 are explanatory views of first to third add/drop modules, respectively.

FIG. 22 is an explanatory view of a first add/drop module 10. This add/drop module 10 is constituted such that an optical circulator 120 is connected to one end of the diffraction grating device 100 whereas an optical circulator 130 is connected to the other end of the diffraction grating device 100. The optical circulator 120 has a first terminal 121, a second terminal 122, and a third terminal 123. Light inputted to the first terminal 121 is outputted from the second terminal 122 to the diffraction grating device 100, whereas light inputted to the second terminal 122 is outputted from the third terminal 123. The optical circulator 130 has a first terminal 131, a second terminal 132, and a third terminal 133. Light inputted to the first terminal 131 is outputted from the second terminal 132 to the diffraction grating device 100, whereas light inputted to the second terminal 132 is outputted from the third terminal 133.

When wavelengths $\lambda_{2m+1}$ of light are inputted to the first terminal 121 of the optical circulator 120, these wavelengths $\lambda_{2m+1}$ of light are outputted from the second terminal 122 of the optical circulator 120 to the diffraction grating device 100, and then are transmitted through the diffraction grating device 100, so as to be inputted to the second terminal 132 of the optical circulator 130 and then outputted from the third terminal 133 thereof. When wavelengths $\lambda_{2m}$ of light are inputted to the first terminal 131 of the optical circulator 130, these wavelengths $\lambda_{2m}$ of light are outputted from the second terminal 132 of the optical circulator 130 to the diffraction grating device 100, and then are reflected by the diffraction grating device 100, so as to be inputted to the second terminal 132 of the optical circulator 130 and then outputted from the third terminal 133 thereof. Namely, in this case, the add/drop module 10 acts as a multiplexer, so as to multiplex the wavelengths $\lambda_{2m+1}$ of light inputted to the first terminal 121 of the optical circulator 120 and the wavelengths $\lambda_{2m}$ of light inputted to the first terminal 131 of the optical circulator 130, and output thus multiplexed wavelengths $\lambda_1$ to $\lambda_{2M}$ of light from the third terminal 133 of the optical circulator 130. When the add/drop module 10 is used only as a multiplexer, the optical circulator 120 is unnecessary.

When wavelengths $\lambda_1$ to $\lambda_{2M}$ of light are inputted to the first terminal 121 of the optical circulator 120, these wavelengths of light are outputted from the second terminal 122 of the optical circulator 120 to the diffraction grating device 100. Among these wavelengths, the wavelengths $\lambda_{2m}$ of light are reflected by the diffraction grating device 100, so as to be inputted to the second terminal 122 of the optical circulator 120 and then outputted from the third terminal 123 thereof. On the other hand, the wavelengths $\lambda_{2m+1}$ of light are transmitted through the diffraction grating device 100, so as to be inputted to the second terminal 132 of the optical circulator 130 and then outputted from the third terminal 133 thereof. Namely, in this case, the add/drop module 10 acts as a demultiplexer, so as to demultiplex wavelengths $\lambda_1$ to $\lambda_{2M}$ and output wavelengths $\lambda_{2m}$ of light from the third terminal 123 of the optical circulator 120 and wavelengths $\lambda_{2m+1}$ of light from the third terminal 133 of the optical circulator 130. When the add/drop module 10 is used only as a demultiplexer, the optical circulator 130 is unnecessary.

The add/drop module 10 acts as a multiplexer and a demultiplexer, thus acting as an optical ADM (Add/Drop Multiplexer) as well. Namely, the add/drop module 10 outputs (drops) from the third terminal 123 of the optical circulator 120 wavelengths $\lambda_{2m}$ of light among the wavelengths $\lambda_1$ to $\lambda_{2M}$ inputted to the first terminal 121 of the optical circulator 120, and inputs (adds) wavelengths $\lambda_{2m}$ of light carrying other information from the first terminal 131 of the optical circulator 130. Then, the add/drop module 10 multiplexes the wavelengths $\lambda_{2m+1}$ of light among the wavelengths $\lambda_1$ to $\lambda_{2M}$ inputted to the first terminal 121 of the optical circulator 120, and the wavelengths $\lambda_{2m}$ of light inputted to the third terminal 131 of the optical circulator 130, and outputs thus multiplexed wavelengths $\lambda_1$ to $\lambda_{2M}$ from the third terminal 133 of the optical circulator 130.

Figure 23:
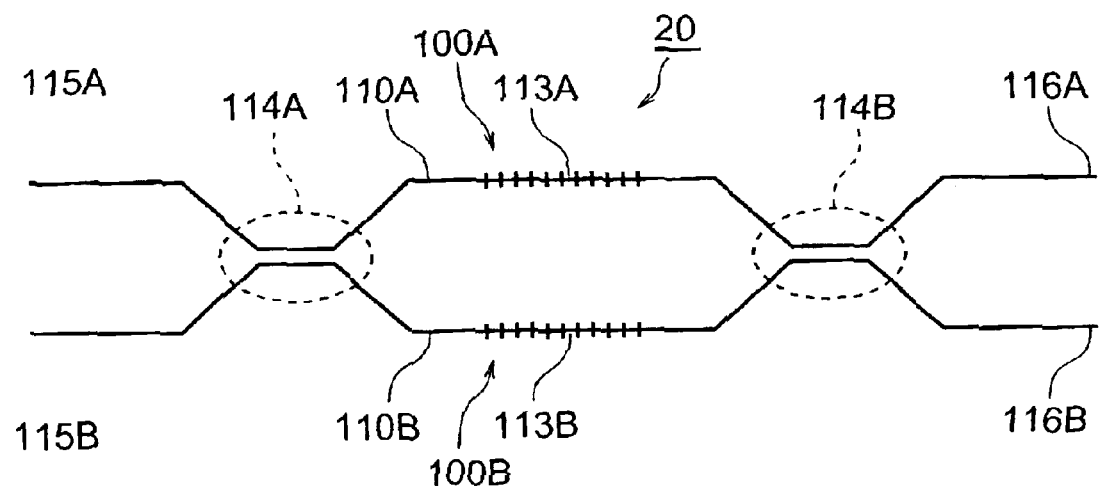

FIG. 23 is an explanatory view of a second add/drop module 20. In this add/drop module 20, optical fibers 110A and 110B are optically coupled to each other by way of optical couplers 114A and 114B. A diffraction grating 113A is formed in a predetermined area of the optical fiber 110A between the optical couplers 114A and 114B, so as to yield a diffraction grating device 100A. On the other hand, a diffraction grating 113B is formed in a predetermined area of the optical fiber 110B between the optical couplers 114A and 114B, so as to yield a diffraction grating device 100B. Each of the diffraction grating devices 100A and 100B is equivalent to the diffraction grating device 100 mentioned above.

When wavelengths $\lambda_{2m+1}$ of light are inputted to a first end 115A of the optical fiber 110A in the add/drop module 20, these wavelengths of light are split by the optical coupler 114A, and thus split components are reflected by their corresponding diffraction grating devices 100A, 100B and then are combined by the optical coupler 114B, so as to be outputted from a second end 116A of the optical fiber 110A. When wavelengths $\lambda_{2m}$ of light are inputted to a second end 116B of the optical fiber 110B, these wavelengths of light are split by the optical coupler 114B, and thus split components are transmitted through their corresponding diffraction grating devices 100A, 100B and then are combined by the optical coupler 114B, so as to be outputted from the second end 116A of the optical fiber 110A. Namely, in this case, the add/drop module 20 acts as a multiplexer, so as to multiplex the wavelengths $\lambda_{2m+1}$ of light inputted to the first end 115A of the optical fiber 110A and the wavelengths $\lambda_{2m}$ of light inputted to the second end 116B of the optical fiber 110B, and output thus multiplexed wavelengths $\lambda_1$ to $\lambda_{2M}$ of light from the second end 116A of the optical fiber When wavelengths $\lambda_1$ to $\lambda_{2M}$ of light are inputted to the first end 115A of the optical fiber 110A in the add/drop module 20, these wavelengths of light are split by the optical coupler 114A, and thus split components are outputted to their corresponding diffraction grating devices 100A, 100B. Among these wavelengths of light, wavelengths $\lambda_{2m}$ of light are reflected by the diffraction grating devices 100A, 100B and then are multiplexed by the optical coupler 114A, so as to be outputted from a first end 115B of the optical fiber 110B. On the other hand, wavelengths $\lambda_{2m+1}$ of light are transmitted though the diffraction grating devices 100A, 100B and then are multiplexed by the optical coupler 114B, so as to be outputted from the second end 116A of the optical fiber 110A. Namely, in this case, the add/drop module 20 acts as a demultiplexer, so as to demultiplex wavelengths $\lambda_1$ to $\lambda_{2M}$ of light inputted to the first end 115A of the optical fiber 110A and output the wavelengths $\lambda_{2m}$ of light from the first end 115B of the optical fiber 110B and the wavelengths $\lambda_{2m+1}$ of light from the second end 116A of the optical fiber 110A.

The add/drop module 20 acts as a multiplexer and a demultiplexer, thereby acting as an optical ADM as well. Namely, the add/drop module 20 outputs (drops) from the first end 115B of the optical fiber 110B wavelengths $\lambda_{2m}$ of light among the wavelengths $\lambda_1$ to $\lambda_{2M}$ of light inputted to the first end 115A of the optical fiber 110A, and inputs (adds) wavelengths $\lambda_{2m}$ of light carrying other information from the second terminal 116B of the optical fiber 110B. Then, the optical add/drop module 20 multiplexes wavelengths $\lambda_{2m+1}$ of light among the wavelengths $\lambda_1$ to $\lambda_{2M}$ of light inputted to the first end 115A of the optical fiber 110A, and the wavelengths $\lambda_{2m}$ of light inputted to the second terminal 116B of the optical fiber 110B, and outputs thus multiplexed wavelengths $\lambda_1$ to $\lambda_{2M}$ of light from the second end 116A of the optical fiber 110A.

Figure 24:
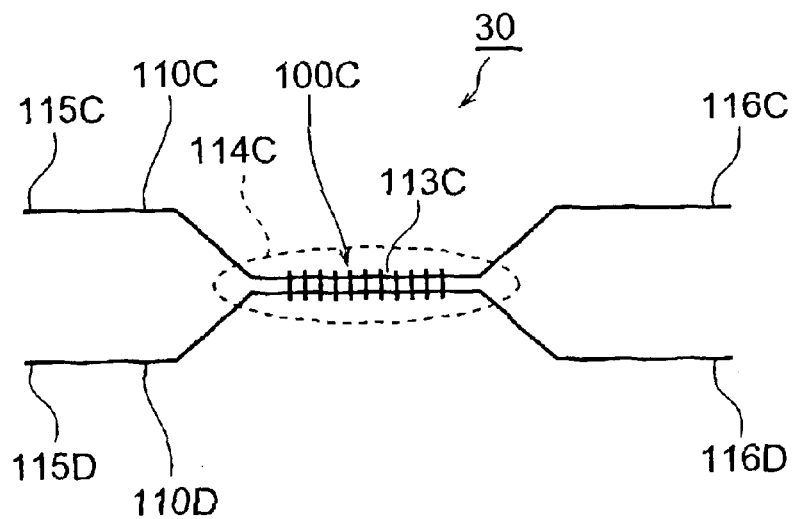

FIG. 24 is an explanatory view of a third add/drop module 30. In this add/drop module 30, optical fibers 110C and 110D are optically coupled to each other by way of an optical coupler 114C, whereas a diffraction grating 113C is formed in a predetermined area of the fused part between the optical fibers 110C and 110D in the optical coupler 114C, so as to yield a diffraction grating device 100C. This diffraction grating device 100C is equivalent to the diffraction grating device 100 mentioned above. Here, the diffraction grating 113C is formed in each of the respective core regions of the optical fibers 110C and 110D.

When wavelengths $\lambda_{2m+1}$ of light are inputted to a first end 115C of the optical fiber 110C in this add/drop module 30, these wavelengths of light are transmitted through the diffraction grating device 100C, so as to be outputted from a second end 116C of the optical fiber 110C. When wavelengths $\lambda_{2m}$ of light are inputted to a second end 116D of the optical fiber 110D, these wavelengths of light are reflected by the diffraction grating device 100C, so as to be outputted from the second end 116C of the optical fiber 110C. Namely, in this case, the add/drop module 30 acts as a multiplexer, so as to multiplex the wavelengths $\lambda_{2m+1}$ of light inputted to the first end 115C of the optical fiber 110C and the wavelengths $\lambda_{2m}$ of light inputted to the second end 116D of the optical fiber 110D, and output thus multiplexed wavelengths $\lambda_1$ to $\lambda_{2M}$ of light from the second end 116C of the optical fiber 110C.

When the wavelengths $\lambda_1$ to $\lambda_{2M}$ of light are inputted to the first end 115C of the optical fiber 110C in the add/drop module 30, these wavelengths of light reach the diffraction grating device 100C. Among these wavelengths of light, wavelengths $\lambda_{2m}$ of light are reflected by the diffraction grating device 100C, so as to be outputted from a first end 115D of the optical fiber 110D. On the other hand, wavelengths $\lambda_{2m+1}$ of light are transmitted through the diffraction grating device 100C, so as to be outputted from the second end 116C of the optical fiber 110C. Namely, in this case, the add/drop module 30 acts as a demultiplexer, so as to demultiplex wavelengths $\lambda_1$ to $\lambda_{2M}$ inputted to the first end 115C of the optical fiber 110C, and output wavelengths $\lambda_{2m}$ of light from the first end 115D of the optical fiber 110D and wavelengths $\lambda_{2m+1}$ of light from the second end 116C of the optical fiber 110C.

This add/drop module 30 acts as a multiplexer and a demultiplexer, thereby acting as an optical ADM as well. Namely, the add/drop module 30 outputs (drops) from the first end 115D of the optical fiber 110D wavelengths $\lambda_{2m}$ of light among the wavelengths $\lambda_1$ to $\lambda_{2M}$ inputted to the first end 115C of the optical fiber 110C, and inputs (adds) wavelengths $\lambda_{2m}$ of light carrying other information from the second end 116D of the optical fiber 110D. Then, the add/drop module 30 multiplexes wavelengths $\lambda_{2m+1}$ of light among the wavelengths $\lambda_1$ to $\lambda_{2M}$ inputted to the first end 115C of the optical fiber 110C, and the wavelengths $\lambda_{2m}$ of light inputted to the second end 116D of the optical fiber 110D, and outputs thus multiplexed wavelengths $\lambda_1$ to $\lambda_{2M}$ of light from the second end 116C of the optical fiber 110C.

Each of the diffraction grating devices included in the foregoing add/drop modules 10, 20, and 30 is the diffraction grating device 100 in accordance with the above-mentioned embodiment, and is excellent in reflecting characteristics. In the diffraction grating device 100, each of the add/drop modules 10, 20, and 30 exhibits a low transmittance within the reflection wavelength band and a low reflectance outside the reflection wavelength band, whereby it is hard to yield crosstalk, and exhibits a low reception error occurrence ratio and a low power loss for wavelengths $\lambda_{2m}$ of light even when the difference between the reflection wavelengths $\lambda_{2m}$ and transmission wavelengths $\lambda_{2m+1}$ is small.

Figure 25:
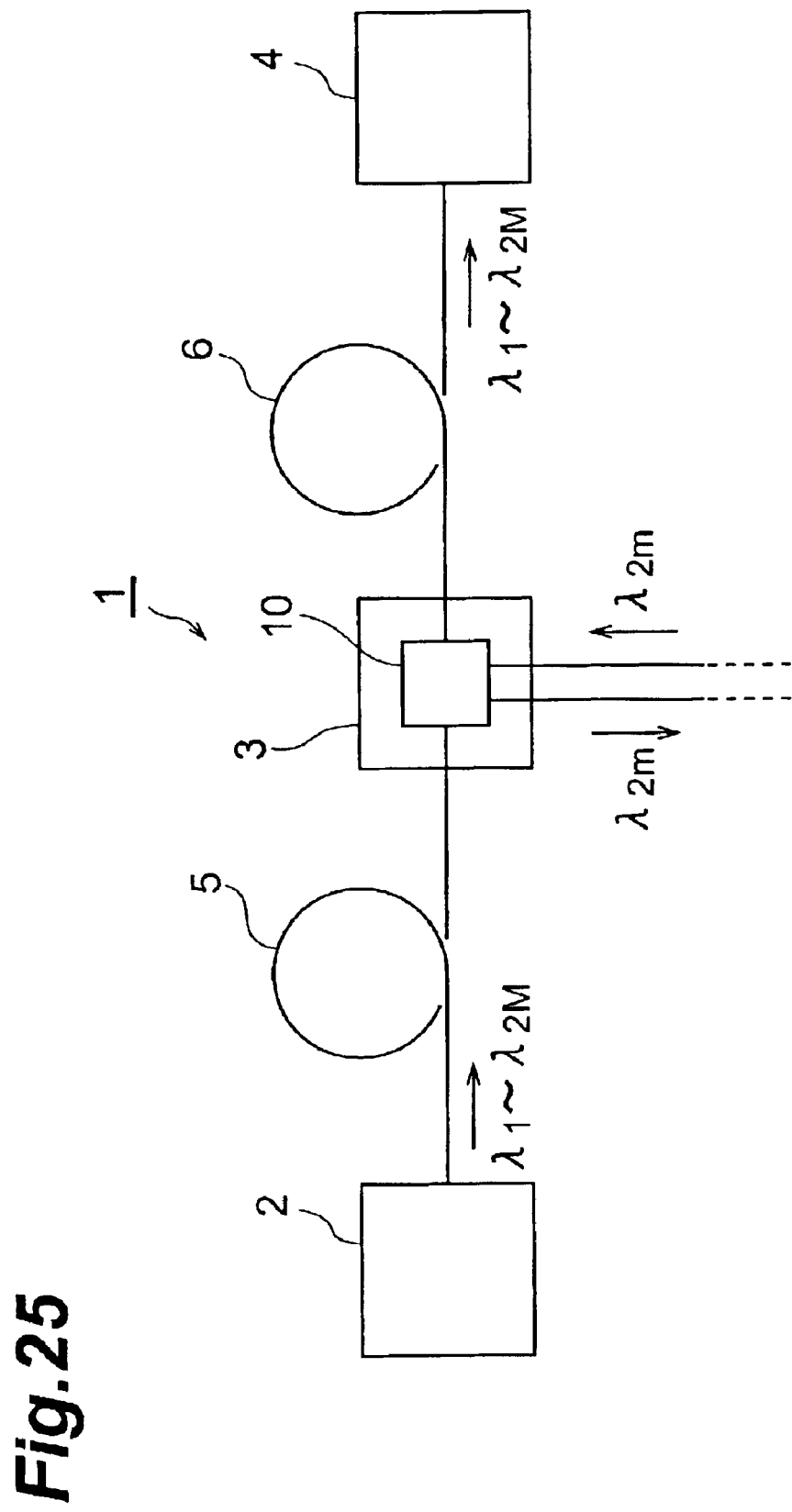
FIG. 25 is a schematic diagram of the optical transmission system in accordance with an embodiment.

The optical transmission system in accordance with an embodiment will now be explained. FIG. 25 is a schematic diagram of the optical transmission system 1 in accordance with this embodiment. In the optical transmission system 1, a transmitting station 2 and a repeater station 3 are connected to each other by an optical fiber transmission line 5, whereas the repeater station 3 and a receiving station 4 are connected to each other by an optical fiber transmission line 6. The repeater station 3 is provided with an add/drop module 10.

The transmitting station 2 wavelength-multiplexes wavelengths $\lambda_1$ to $\lambda_{2M}$ of signal light, and sends thus multiplexed signal light to the optical fiber transmission line 5. The repeater station 3 inputs the wavelengths $\lambda_1$ to $\lambda_{2M}$ of signal light propagated through the optical fiber transmission line 5, which are then demultiplexed by the add/drop module 10, whereby wavelengths $\lambda_{2m+1}$ of signal light are sent to the optical fiber transmission line 6, whereas wavelengths $\lambda_{2m}$ of signal light are sent to another optical fiber transmission line. By using the add/drop module 10, the repeater station 3 sends to the optical fiber transmission line 6 wavelengths $\lambda_{2m}$ of signal light inputted by way of another optical fiber transmission line. The receiving station 4 inputs wavelengths $\lambda_1$ to $\lambda_{2M}$ of signal light propagated through the optical fiber transmission line 6, demultiplexes them into individual wavelengths, and then receives these individual wavelengths.

The optical transmission system 1 uses the add/drop module 10 including the diffraction grating device 100 in accordance with the above-mentioned embodiment, so as to multiplex or demultiplex wavelengths $\lambda_1$ to $\lambda_{2M}$ of signal light. Therefore, even when the difference between the reflection wavelengths $\lambda_{2m}$ and transmission wavelengths $\lambda_{2m+1}$ is small in the diffraction grating device 100, crosstalk is hard to occur, reception error occurrence ratio is low, and power loss for reflection wavelengths $\lambda_{2m}$ of light is low. Here, the add/drop module 20 or 30 may be provided in place of the add/drop module 10 as well.

Without being restricted to the above-mentioned embodiments, the present invention can be modified in various manners. For example, though the above-mentioned embodiments relate to cases where the optical waveguide is an optical fiber, the same holds in the case of a planar optical waveguide formed on a planar substrate.

Also, though the above-mentioned embodiments relate to cases where the phase grating mask 200 is displaced with respect to the optical fiber 110, the optical fiber 110 may be displaced with respect to the phase grating mask 200 to the contrary.

In the present invention, as explained in detail in the foregoing, a diffraction efficiency distribution of the phase grating mask is measured by diffraction efficiency distribution measuring means in the diffraction efficiency distribution measuring step. Then, in the refractive index modulating step, refractive index modulating means adjusts the amplitude of refractive index modulation according to thus measured diffraction efficiency distribution of the phase grating mask, and forms a refractive index modulation in a predetermined region of an optical waveguide. Thus, even when the diffraction efficiency distribution of the phase grating mask deviates from a desirable distribution, the influence of deviation can be canceled out, whereby a diffraction grating device having a desirable characteristic can be made.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of making a diffraction grating device, in which an optical waveguide is irradiated, by way of a phase grating mask, with refractive index modulation inducing light capable of inducing a refractive index modulation in a predetermined region of said optical waveguide so as to form a diffraction grating in said predetermined region, said method comprising:

a diffraction efficiency distribution measuring step of measuring a diffraction efficiency distribution of said phase grating mask; and a refractive index modulating step of longitudinally scanning said optical waveguide with said refractive index modulation inducing light by way of said phase grating mask and irradiating said optical waveguide with said refractive index modulation inducing light so as to modulate a refractive index of said predetermined region;

wherein, in said refractive index modulating step, upon scanning with said refractive index modulation inducing light, longitudinal relative positions of said phase grating mask and said optical waveguide are changed according to said diffraction efficiency distribution of said phase grating mask.

2. A diffraction grating device according to claim 1, wherein said phase grating mask is longitudinally vibrated relative to said optical waveguide with a predetermined amplitude in said refractive index modulating step.

3. A diffraction grating device according to claim 2, wherein said predetermined amplitude at the time of relatively vibrating said phase grating mask and said optical waveguide with respect to each other is adjusted at each position in a longitudinal direction according to said diffraction efficiency distribution of said phase grating mask.

4. A diffraction grating device according to claim 1, wherein, in said refractive index modulating step, said predetermined region of said optical waveguide is scanned with said refractive index modulation inducing light for a plurality of times, whereas the amount of fluctuation in said relative positions at an odd-numbered scan and the amount of fluctuation in said relative positions at an even-numbered scan are made symmetrical to each other about a center of fluctuation of said relative positions.

5. A diffraction grating device according to claim 1, wherein the amount of fluctuation in said relative positions is determined according to a target value of refractive index modulation amplitude designed according to said diffraction efficiency distribution.

6. A diffraction grating device according to claim 5, wherein the amount of fluctuation in said relative positions is determined according to a power distribution of said refractive index modulation inducing light as well.

7. A diffraction grating device manufactured by the method according to claim 1.

8. An optical communication system comprising the diffraction grating device according to claim 7.

9. An apparatus for making a diffraction grating device, which irradiates, by way of a phase grating mask, an optical waveguide with refractive index modulation inducing light capable of inducing a refractive index modulation in a predetermined region of said optical waveguide so as to form a diffraction grating in said predetermined region, said apparatus comprising:

diffraction efficiency distribution measuring means for measuring a diffraction efficiency distribution of said phase grating mask;

refractive index modulating means for longitudinally scanning said optical waveguide with said refractive index modulation inducing light by way of said phase grating mask and irradiating said optical waveguide with said refractive index modulation inducing light so as to modulate a refractive index of said predetermined region; and relative position changing means for changing longitudinal relative positions of said phase grating mask and optical waveguide according to said diffraction efficiency distribution of said phase grating mask upon scanning with said refractive index modulation inducing light.

10. An apparatus for making a diffraction grating device according to claim 9, wherein said relative position changing means comprises a piezoelectric device for changing at least one of positions of said phase grating mask and optical waveguide.

11. An apparatus for making a diffraction grating device, which irradiates, by way of a phase grating mask, an optical waveguide with refractive index modulation inducing light capable of inducing a refractive index modulation in a predetermined region of said optical waveguide so as to form a diffraction grating in said predetermined region, said apparatus comprising:

refractive index modulating means for longitudinally scanning said optical waveguide with refractive index modulation inducing light by way of said phase grating mask and irradiating said optical waveguide with said refractive index modulation inducing light so as to modulate a refractive index of said predetermined region; and relative position changing means for changing longitudinal relative positions of said phase grating mask and optical waveguide according to a diffraction efficiency distribution of said phase grating mask upon scanning with said refractive index modulation inducing light.

* * * * *